United States Patent
Groom et al.

(10) Patent No.: US 7,665,493 B2
(45) Date of Patent: Feb. 23, 2010

(54) FUEL-DISPENSING NOZZLE INHIBITOR

(75) Inventors: J Bradley Groom, Oxford, OH (US); Michael S. Brock, Connersville, IN (US); Timothy J. King, Connersville, IN (US); Jeffrey E. Devall, Greenuup, IL (US)

(73) Assignee: Stant Manufacturing Inc., Connersville, IN (US)

( * ) Notice: Subject to any disclaimer, the term of this patent is extended or adjusted under 35 U.S.C. 154(b) by 603 days.

(21) Appl. No.: 11/276,011

(22) Filed: Feb. 9, 2006

(65) Prior Publication Data

US 2007/0034287 A1 Feb. 15, 2007

Related U.S. Application Data

(60) Provisional application No. 60/651,788, filed on Feb. 10, 2005, provisional application No. 60/721,745, filed on Sep. 29, 2005.

(51) Int. Cl.
*B65B 3/04* (2006.01)
(52) U.S. Cl. .................................. 141/350; 220/86.2
(58) Field of Classification Search ............. 141/311 R, 141/348–350, 367; 220/86.2
See application file for complete search history.

(56) References Cited

U.S. PATENT DOCUMENTS

| | | | |
|---|---|---|---|
| 4,034,784 A | 7/1977 | Ball et al. | |
| 4,248,279 A | 2/1981 | Warmbold | |
| 4,687,034 A | 8/1987 | Graiff et al. | |
| 5,212,864 A | 5/1993 | Bates et al. | |
| 5,322,100 A | 6/1994 | Buechler et al. | |
| 5,385,179 A | 1/1995 | Bates et al. | |
| 5,439,129 A | 8/1995 | Buechler | |
| 6,230,739 B1 * | 5/2001 | Gericke | 141/349 |
| 6,302,169 B1 | 10/2001 | Pulos | |
| 6,382,270 B1 | 5/2002 | Gzik | |
| 6,539,990 B1 | 4/2003 | Levey et al. | |
| 6,607,014 B2 | 8/2003 | Webb | |
| 6,966,349 B1 * | 11/2005 | Laduke | 141/367 |
| 7,077,178 B2 * | 7/2006 | Hedevang | 141/367 |
| 7,182,111 B2 * | 2/2007 | McClung et al. | 141/349 |
| 7,293,586 B2 * | 11/2007 | Groom et al. | 141/350 |
| 7,302,977 B2 * | 12/2007 | King et al. | 141/367 |

(Continued)

FOREIGN PATENT DOCUMENTS

DE 4039269 2/1992

(Continued)

OTHER PUBLICATIONS

Machine Translation of patent DE4039269, Joachim Fornbacher, Feb. 6, 1992.*

(Continued)

*Primary Examiner*—Gregory L Huson
*Assistant Examiner*—Nicolas A Arnett
(74) *Attorney, Agent, or Firm*—Barnes & Thornburg LLP

(57) ABSTRACT

A nozzle inhibitor is positioned in a filler neck closure assembly to prevent a user from pumping unleaded fuel into a diesel fuel tank. The nozzle inhibitor blocks full insertion of a small-diameter unleaded fuel nozzle into the filler neck closure assembly yet allows full insertion of a large-diameter diesel fuel nozzle into the filler neck closure assembly.

9 Claims, 13 Drawing Sheets

U.S. PATENT DOCUMENTS

| | | |
|---|---|---|
| 2002/0020465 A1 | 2/2002 | Gzik |
| 2002/0170622 A1 | 11/2002 | Webb |
| 2004/0025967 A1 | 2/2004 | Henry |
| 2005/0000592 A1* | 1/2005 | Bartlett ........................ 141/367 |

FOREIGN PATENT DOCUMENTS

| | | |
|---|---|---|
| DE | 10157090 | 4/2003 |
| EP | 1262355 | 12/2002 |
| EP | 1319545 | 6/2003 |
| FR | 2741014 | 5/1997 |
| GB | 2230765 | 10/1990 |
| WO | WO9400351 | 1/1994 |

OTHER PUBLICATIONS

Page from European Search Report for EP06250718, dated Oct. 4, 2006.

* cited by examiner

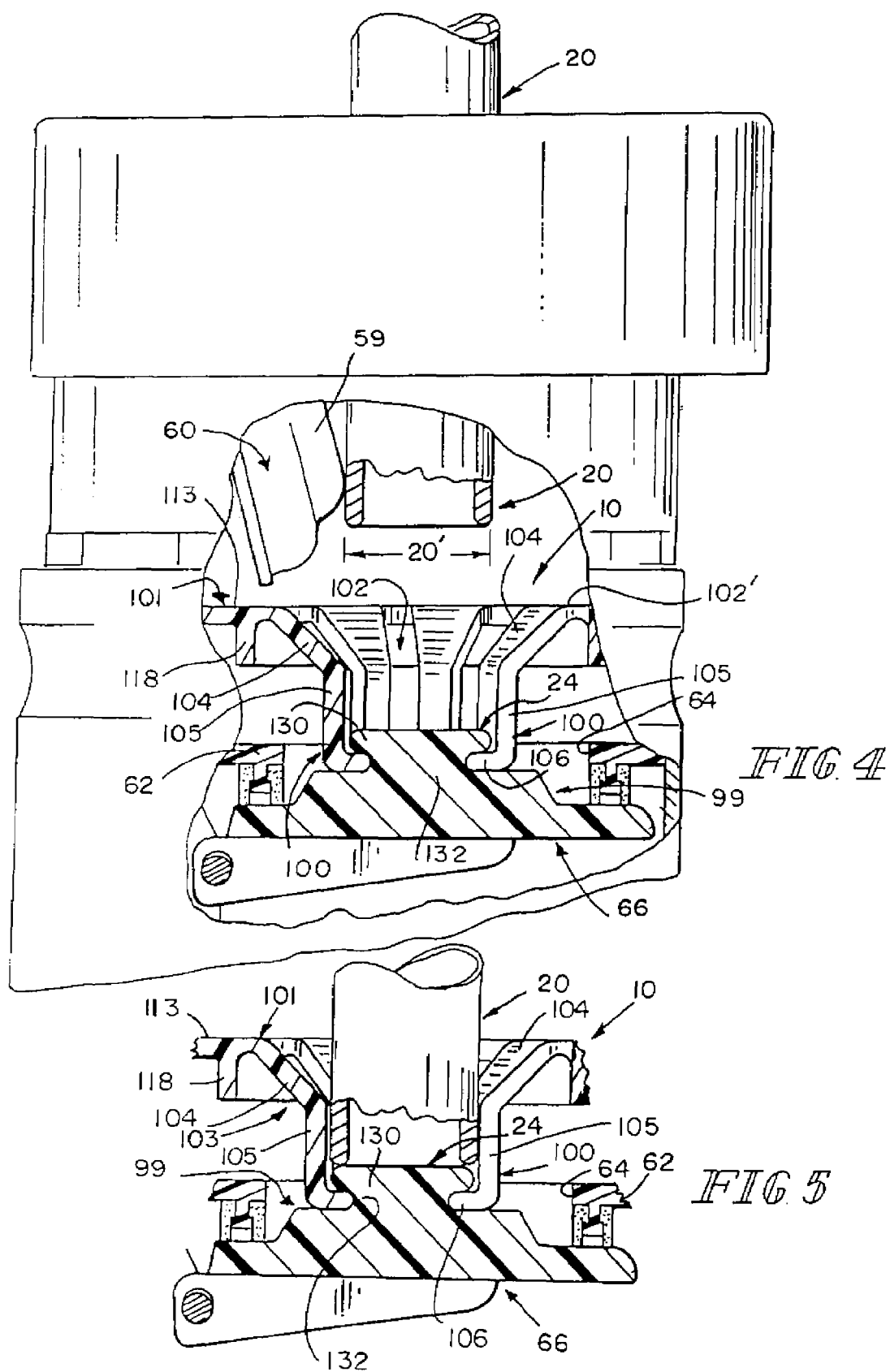

US 7,665,493 B2

FUEL-DISPENSING NOZZLE INHIBITOR

This application claims priority under 35 U.S.C. §119(e) to U.S. Provisional Application Ser. No. 60/651,788, filed Feb. 10, 2005 and U.S. Provisional Application Ser. No. 60/721,745, filed Sep. 29, 2005, which are expressly incorporated by reference herein.

BACKGROUND

The present disclosure relates to a filler neck closure assembly, and particularly to a filler neck closure for use in a fuel tank filler neck. More particularly, the present disclosure relates to a device for preventing the introduction of a nozzle for unleaded fuel into the filler neck of a fuel tank of a motor vehicle fitted with a diesel internal combustion engine.

Unleaded fuel should not be introduced into a fuel tank filler neck of a motor vehicle powered by a diesel engine. It is customary to use a small-diameter nozzle (e.g., 22 mm or less) to dispense unleaded fuel into a fuel tank filler neck and to use a larger-diameter nozzle (e.g., 24 mm or more) to dispense diesel and leaded fuel.

SUMMARY

A nozzle inhibitor is configured to be coupled to a fuel tank filler neck and arranged to allow only a fuel-dispensing pump nozzle having an outer diameter that is greater than a specified minimum diameter to be inserted into the filler neck to a depth sufficient so that a user may dispense fuel from that nozzle into a fuel tank coupled to the filler neck. Such a nozzle inhibitor inhibits insertion of a small-diameter unleaded fuel-dispensing nozzle into a fuel tank filler neck, yet allows a large-diameter diesel fuel-dispensing nozzle to be inserted into the fuel tank filler neck.

In an illustrative embodiment, the nozzle inhibitor is mounted inside a fuel tank filler neck and a retainer is coupled to an upwardly facing surface on a pivotable inner flapper door associated with the filler neck. The nozzle inhibitor normally engages the retainer to "lock" the inner flapper door in a closed position closing a nozzle-receiving passageway formed in the filler neck. A large-diameter nozzle can be moved against the nozzle inhibitor to unlock the inner flapper door; however, the flapper door cannot be unlocked using a small-diameter nozzle.

In an illustrative embodiment, a retainer is coupled to an upwardly facing surface on a pivotable inner flapper door associated with the filler neck and arranged to mate with the flexible hooks included in the nozzle inhibitor when the flapper door has been moved to assume a normal nozzle passageway-closing position. The retainer is configured to mate with the hooks included in the nozzle inhibitor to retain the flapper door positively in the nozzle passageway-closing position until a large-diameter diesel fuel-dispensing nozzle moves to spread the hooks apart so as to disable the nozzle inhibitor and release the flapper door retainer.

In another embodiment, sliding door latches are spring-biased to move relative to a housing to engage retainers coupled to a pivotable flapper door to lock the flapper door in a passageway-closing position. Latch actuators are coupled to the door latches and arranged to engage only a large-diameter diesel fuel-dispensing nozzle moving in the housing to operate the door latches and unlock the flapper door.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 4 is a side elevation view of the filler neck closure assembly of FIG. 3, with portions broken away, showing an inner flapper door in an unpivoted, sealed, closed position and showing a "knob-shaped" retainer in accordance with an illustrative embodiment coupled to the inner flapper door and mated to radially inwardly extending retention fingers included in the hooks provided in the nozzle inhibitor to retain the inner flapper door temporarily in the unpivoted, sealed, closed position as a small-diameter nozzle is being moved downwardly toward a central aperture formed in the nozzle inhibitor and toward the "locked" inner flapper door;

FIG. 5 is a view similar to FIG. 4 showing further downward movement of the small-diameter nozzle into the central aperture formed in the nozzle inhibitor to engage a portion of the retainer gripped by the hooks included in the nozzle inhibitor so that further downward movement of the small-diameter nozzle toward the inner flapper door is blocked and the inner flapper door remains locked in the closed position;

FIG. 9 is a perspective view of a fill tube including a housing coupled to a fuel tank filler neck, with a portion of the fuel tank filler neck broken away to show a side wall of the housing, showing an outer nozzle-receiving opening formed in a top wall of the housing, an upper side opening formed in the side wall of the housing just below an exterior annular filler neck mount ring included in the housing, a portion of a latch actuator included in an illustrative nozzle inhibitor visible in the upper side opening, a lower side opening formed in the side wall of the housing just below the upper opening, and a portion of a flapper door latch included in the illustrative nozzle inhibitor and visible in the lower side opening;

FIG. 10 is an enlarged sectional view of the housing taken along line 10-10 of FIG. 9 showing four spaced-apart radially inwardly projecting nozzle-centering ribs aligned with an annular inner edge of a funnel-shaped outer nozzle guide and located in "2, 4, 8, and 10 o'clock" positions about the annular inner edge, and a top surface of an inner flapper door formed to include five mutually parallel laterally extending segments and showing (in a "6 o'clock" position) the first flapper door latch mating with a first retainer coupled to the top surface of the inner flapper door and the first latch actuator and (in a "12 o'clock" position) a second flapper door latch mating with a second retainer coupled to the top surface of the inner flapper door and a second latch actuator;

FIG. 11 is a perspective view of a filler neck closure assembly including a nozzle inhibitor in accordance with a second embodiment of the present disclosure, with portions broken away, showing the funnel-shaped outer nozzle guide, two of the four nozzle-centering ribs, the spring-biased pivotable inner flapper door, the spaced-apart pair of slidable first and second door latches located just above the inner flapper door and moved toward one another by door-latch return springs to mate with the first and second retainers coupled to a top surface of the inner flapper door so as to lock the inner flapper door in a closed position, and the spaced-apart pair of first and second latch actuators located below the funnel-shaped outer nozzle guide and above the door latches;

FIG. 12 is an enlarged perspective view of a portion of the filler neck closure assembly of FIG. 11 showing, in a space provided between two of the radially inwardly projecting nozzle-centering ribs, the first latch actuator located above the first door latch and a portion of the first retainer coupled to the inner flapper door and mated to the first door latch;

FIG. 13 is a diagrammatic and perspective view of the nozzle inhibitor of FIG. 11 (without the surrounding housing) and a portion of a small-diameter nozzle showing a locked inner flapper door, a pair of spaced-apart retainers coupled to an upwardly facing surface of the inner flapper door, and spring-biased door latches mated with the retainers and mounted for movement relative to the inner flapper door to engage and disengage a companion retainer to lock and unlock the inner flapper door and showing spring-biased latch actuators for moving each of the door latches from an extended door-locking position to a retracted door-releasing position;

FIG. 14 is a side elevation view of a portion of the capless filler neck closure assembly of FIGS. 11-13 showing locking engagement of an anchor bar included in each door latch with a companion retainer to "lock" the spring-biased inner flapper door in a closed position closing an inner nozzle-receiving aperture formed in the housing of the filler neck closure and showing a small-diameter nozzle moving downwardly in the nozzle-receiving passageway provided in the housing in a direction toward the locked inner flapper door;

FIG. 15 is a view similar to FIG. 14 showing engagement of the small-diameter nozzle with the locked inner flapper door to block a user from using the small-diameter nozzle to dispense unleaded fuel into the diesel-engine fuel tank filler neck;

FIG. 16 is a view similar to FIGS. 14 and 15 showing contact of a large-diameter nozzle moving downwardly in the nozzle-receiving passageway with inclined edges on each of the spaced-apart latch actuators while actuator heads included in the latch actuators and formed to provide the inclined edges are spring-biased toward one another to assume projected positions;

FIG. 17 is a view similar to FIGS. 14-16 showing movement of the first and second door latches away from one another to unmate from the first and second retainers coupled to the inner flapper door in response to downward movement of the first and second latch actuators (driven downwardly by the large-diameter nozzle) toward the inner flapper door; and FIG. 18 is a view similar to FIGS. 14-17 showing further downward movement of the large-diameter diesel fuel-dispensing nozzle through the inner nozzle-receiving aperture formed in a partition wall and "past" the opened inner flapper door and showing dispensing of liquid diesel fuel into the diesel-engine fuel tank filler neck.

DETAILED DESCRIPTION

Figure 1:
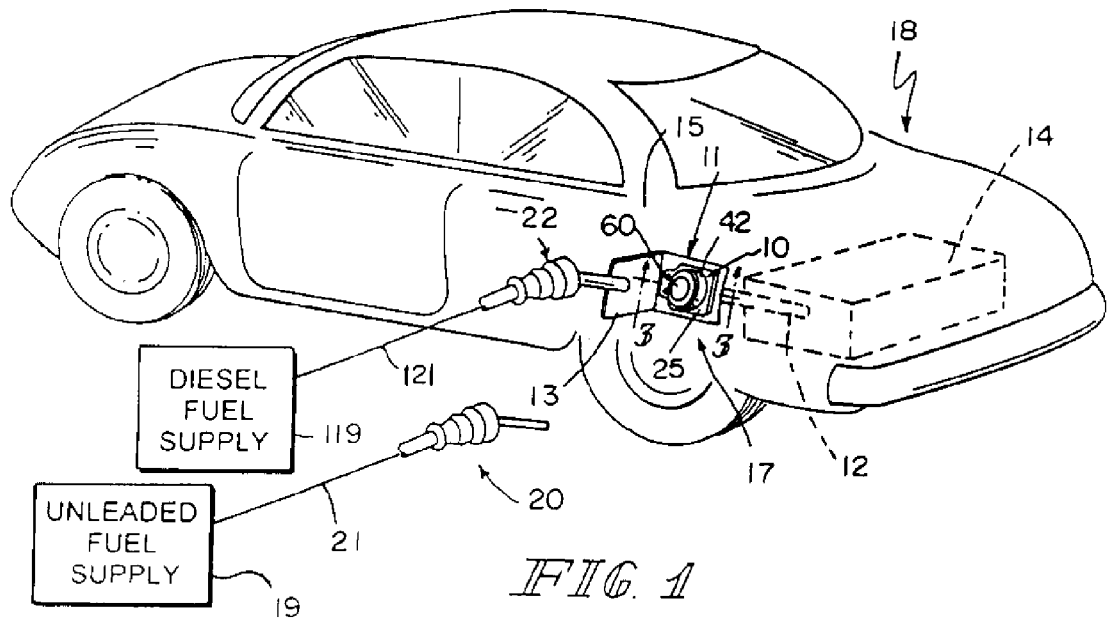
FIG. 1 is a perspective view of a diesel-engine vehicle provided with a "capless" fuel tank filler neck showing an outer filler neck access door moved to an opened position relative to a vehicle body panel to expose an illustrative capless filler neck closure coupled to a filler neck leading to a vehicle fuel tank, showing a large-diameter "diesel" fuel-dispensing pump nozzle coupled to a diesel fuel supply and configured to be inserted into the filler neck closure assembly during vehicle refueling to discharge liquid fuel into the filler neck leading to the vehicle fuel tank, and showing a small-diameter "unleaded" fuel-dispensing pump nozzle that is not authorized for use to refuel the vehicle fuel tank.

A nozzle inhibitor 10 is adapted to be included in a filler neck assembly 11 as shown in FIGS. 1-8 to block use of a small-diameter unleaded fuel-dispensing pump nozzle 20 to dispense non-diesel unleaded fuel into a fuel tank 14 of a diesel-engine vehicle 18. Nozzle inhibitor 10 is made in accordance with a first embodiment of the disclosure and is shown illustratively in FIG. 2. A nozzle inhibitor 210 in accordance with another embodiment of the disclosure also functions to block use of small-diameter nozzles 20 to dispense unleaded fuel into diesel-engine fuel tank filler necks. Nozzle inhibitor 210 is illustrated in FIGS. 9-12 and 14-18 and shown diagrammatically in FIG. 13. It is within the scope of this disclosure to use nozzle inhibitors 10, 210 in "capless" filler neck assemblies as shown in the drawings or in filler necks closed by separate filler neck caps.

Figure 2:
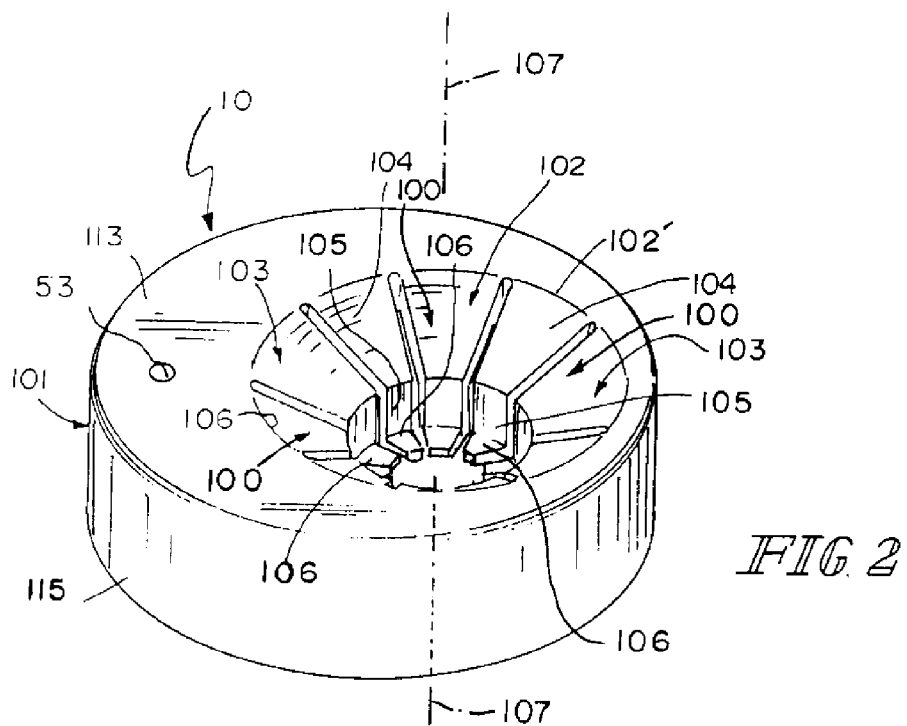
FIG. 2 is an enlarged perspective view of an outer portion of the filler neck closure assembly of FIG. 1 showing an illustrative fuel-dispensing pump nozzle inhibitor in accordance with a first embodiment of the present disclosure.
Figure 3:
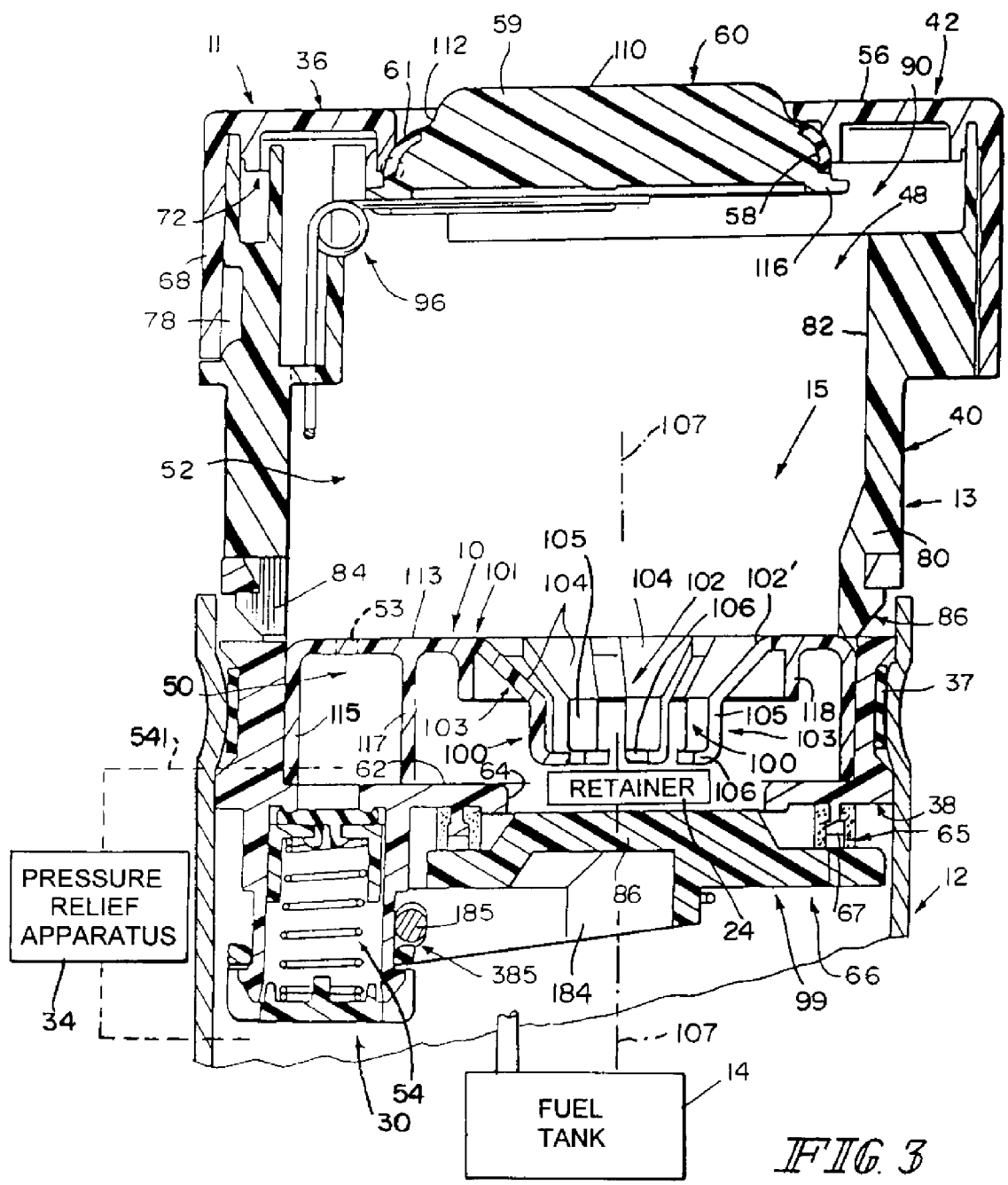
FIG. 3 is a sectional view of the filler neck taken along line 3-3 of FIG. 1 showing an outer appearance door and an inner flapper door in their unpivoted, sealed, closed positions and showing the nozzle inhibitor of FIG. 2 interposed between the outer appearance door and the inner flapper door and provided with a series of hooks arranged to mate with a retainer (shown diagrammatically) coupled to the inner flapper door to move therewith to lock the inner flapper door in a "closed" position to limit downward movement of a small-diameter unleaded fuel-dispensing pump nozzle in the filler neck as suggested in FIGS. 4 and 5 and showing a series of inclined cam ramps included in the hooks and arranged to be engaged and moved by a large-diameter diesel fuel-dispensing pump nozzle to cause the hooks to unmate from the retainer as suggested in FIG. 7 so that the inner flapper door is released and free to move to an opened position as suggested in FIG. 8.

Nozzle inhibitor 10 suggested in FIGS. 1-8 is configured to engage a retainer 24 provided on an inner flapper door 66, which door 66 is movable to open and close a filler neck passageway, normally to lock the inner flapper door 66 in a closed position as shown diagrammatically, for example, in FIG. 3 and illustratively in FIG. 4. By locking inner flapper door 66 in the closed position, entry of a small-diameter unleaded fuel-dispensing nozzle 20 into the fuel tank filler neck of a diesel-engine vehicle is blocked as suggested in FIG. 5. Nozzle inhibitor 10 is configured to allow a user to dispense diesel fuel into a diesel-engine fuel tank filler neck 12 using a large-diameter diesel fuel-dispensing pump nozzle 22 to disengage nozzle inhibitor 10 from retainer 24 to "unlock" inner flapper door 66 so that it can be moved to an opened position to admit the large-diameter nozzle 22 into an aperture 64 normally closed by inner flapper door 66 is shown, for example, in FIGS. 6-8.

Figure 10:
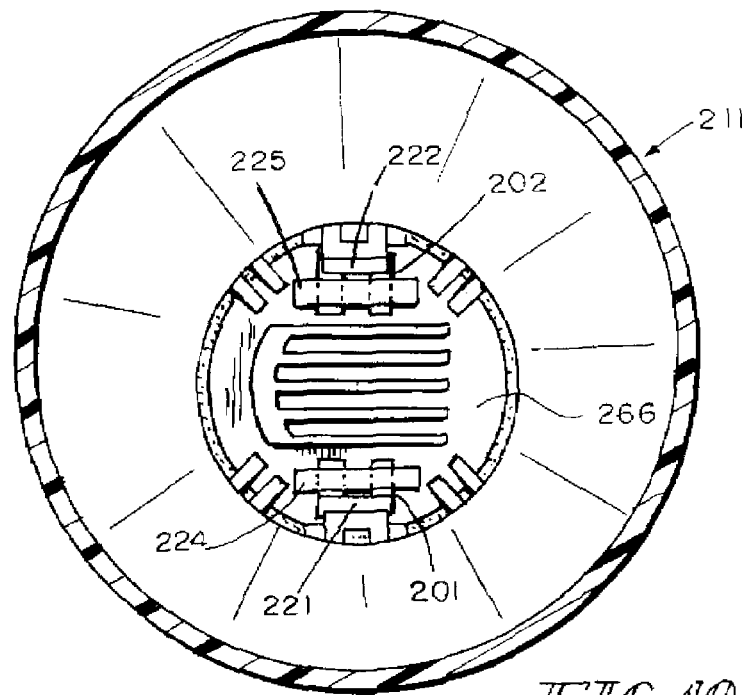
FIGS. 9-18 are views of an illustrative nozzle inhibitor apparatus in accordance with a second embodiment of the present disclosure.
Figure 9:
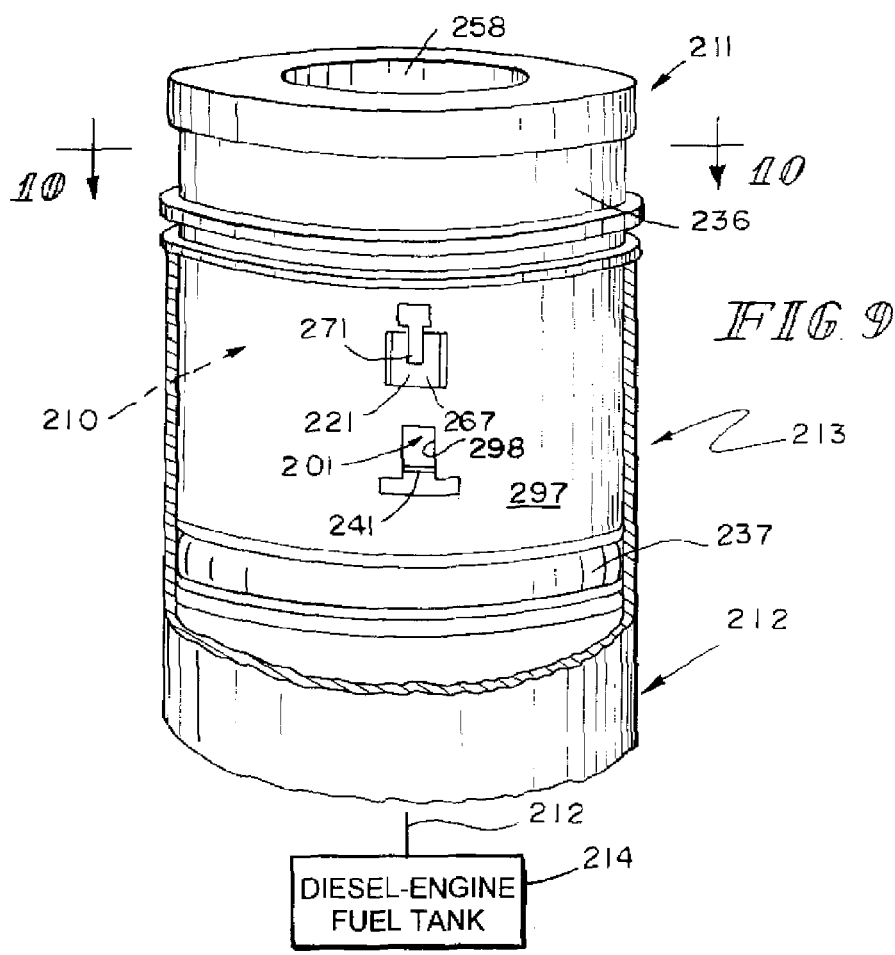
Figure 11:
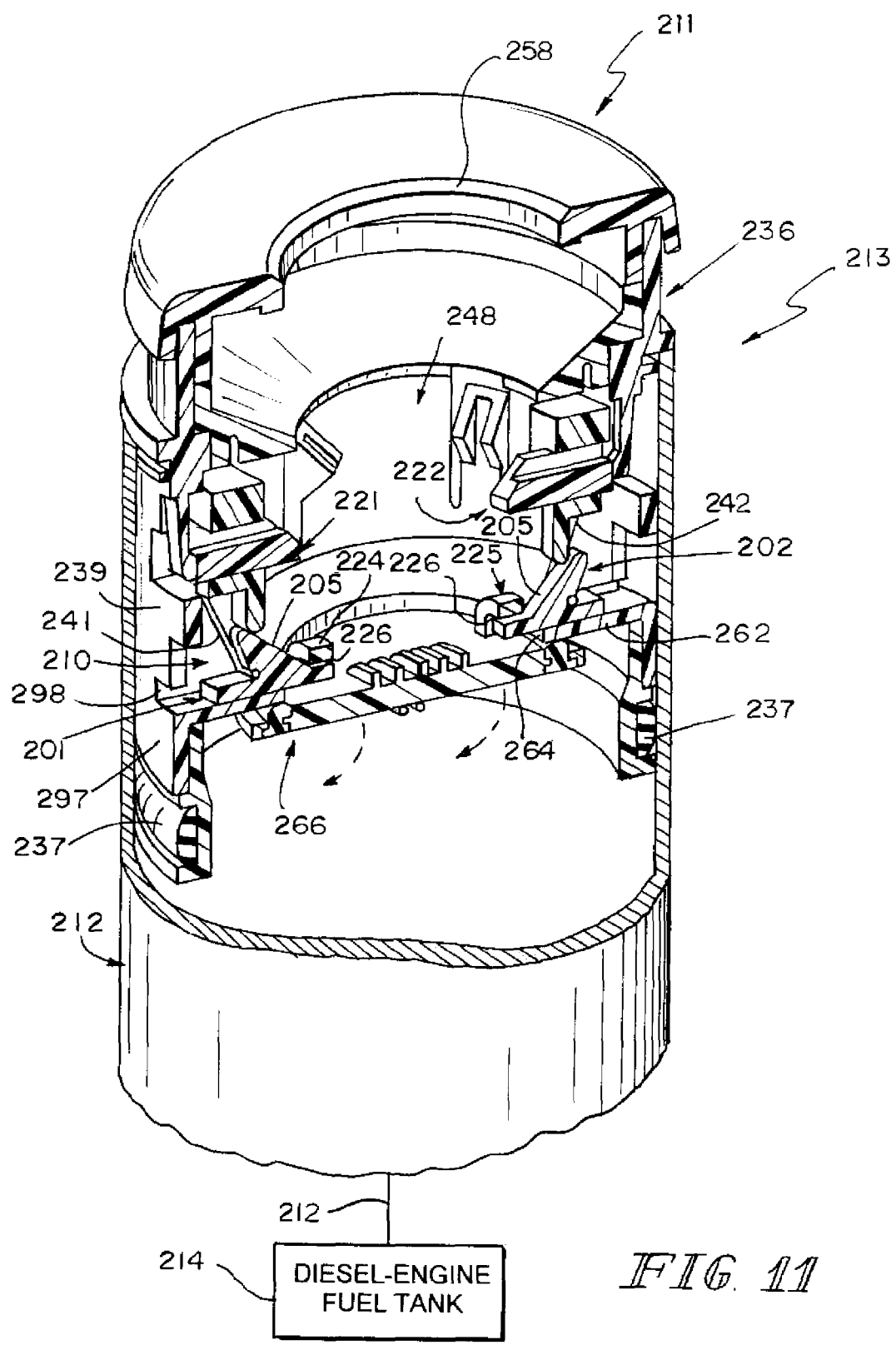
Figure 12:
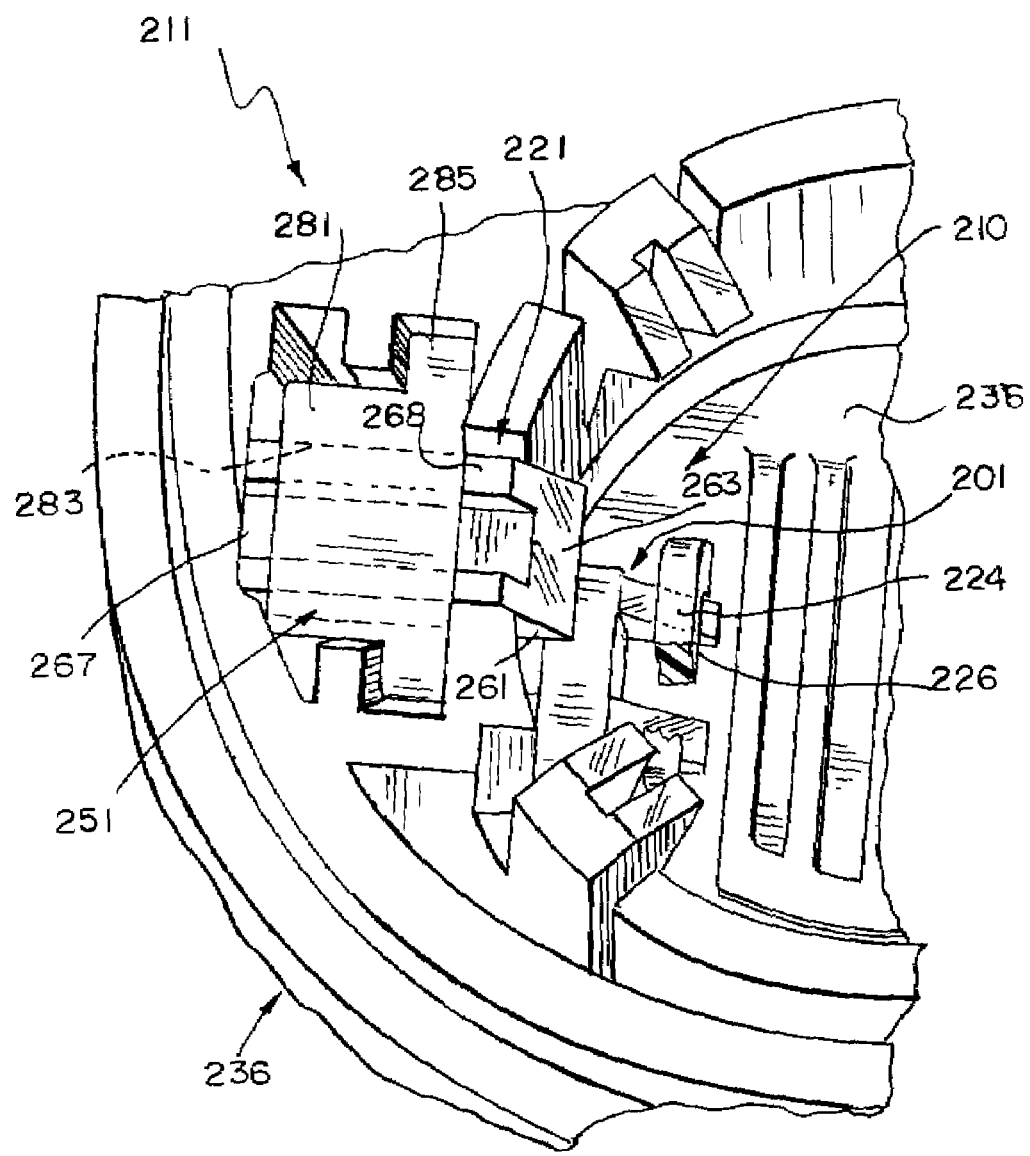
Figure 13:
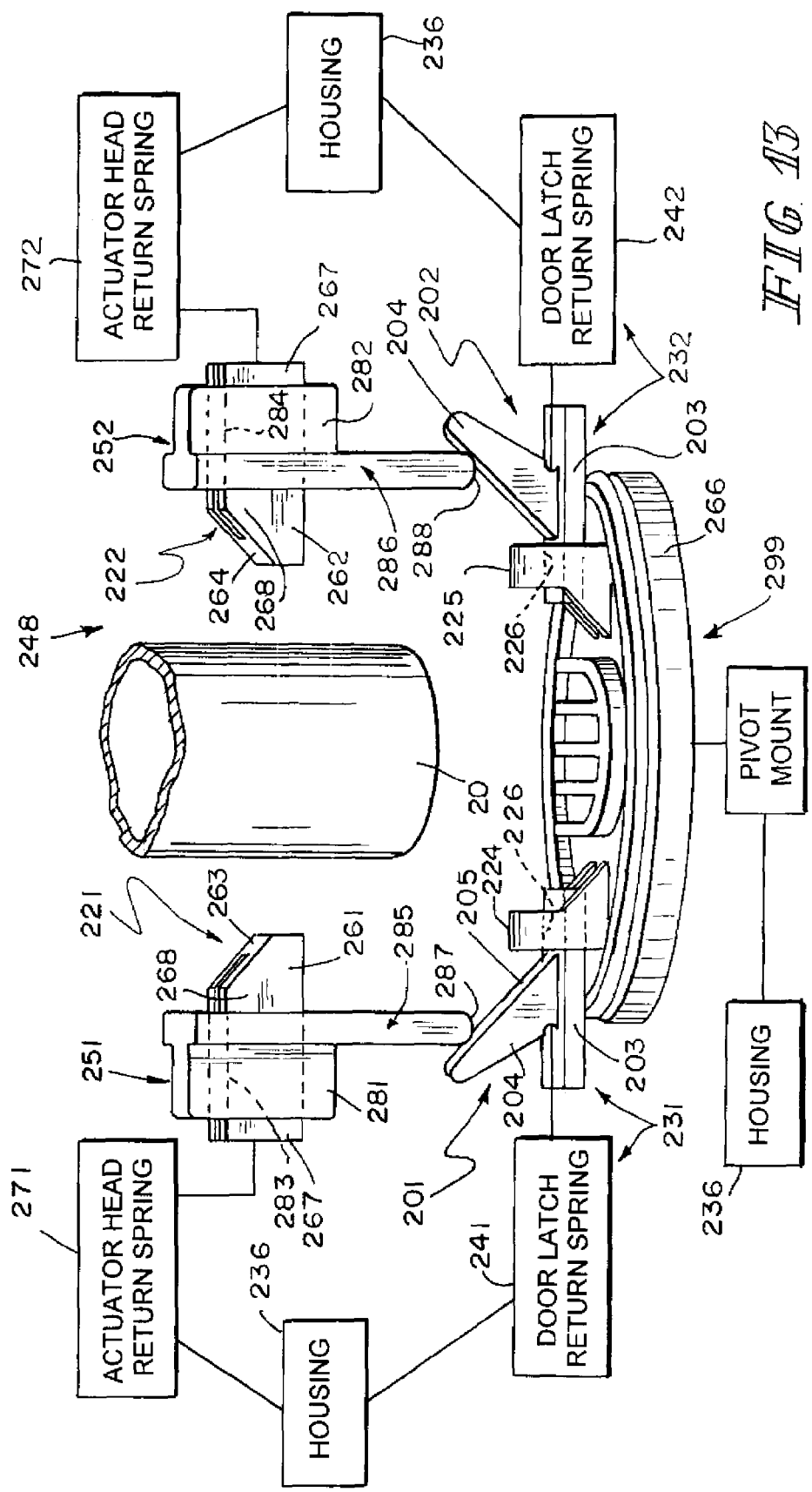

Nozzle inhibitor 210 suggested in FIGS. 9-18 is configured to engage retainers 224, 225 provided on an inner flapper door 266, which door 266 is movable to open and close a nozzle-receiving aperture 258 provided in a filler neck closure assembly 211, normally to lock inner flapper door 258 in the closed position as shown illustratively in FIG. 11 and diagrammatically in FIG. 13. Entry of a small-diameter unleaded fuel-dispensing nozzle 20 into the fuel tank filler neck 212 of a diesel-engine vehicle 18 is blocked by the locked inner flapper door 266. Nozzle inhibitor 210 is configured to allow a user to dispense diesel fuel into the diesel-engine fuel tank filler neck 212 using only a large-diameter diesel fuel-dispensing pump nozzle 22. The large-diameter nozzle 22 is moved in filler neck closure assembly 211 to disengage nozzle inhibitor 210 from retainers 224, 225 on flapper door 266 to "unlock" inner flapper door 266 so that it can be moved by large-diameter nozzle 22 to an opened position to admit large-diameter nozzle 22 into filler neck 212 through a nozzle-receiving aperture 264 normally closed by inner flapper door 266 as shown, for example, in FIGS. 16-18.

A nozzle inhibitor 10 is associated with a filler neck 12 coupled to a "diesel-engine" fuel tank 14 as suggested in FIG. 1 to prevent a fuel-purchasing customer from using a fuel-dispensing pump nozzle to discharge unleaded fuel into a vehicle 18 having a diesel engine (not shown) requiring only diesel fuel. Nozzle inhibitor 10 is configured to block full insertion of a small-diameter unleaded fuel nozzle 20 into filler neck 12 as suggested in FIGS. 4 and 5. However, nozzle inhibitor 10 is configured to allow full insertion of a relatively large-diameter diesel fuel nozzle 22 into filler neck 12 as suggested in FIGS. 6-8. It is within the scope of the present disclosure to mount nozzle inhibitors disclosed herein in a filler neck closed by a removable closure cap.

As shown in FIG. 1, a filler neck closure assembly 11 containing nozzle inhibitor 10 is provided in a vehicle 18 normally to close filler neck 12 extending from fuel tank 14 onboard vehicle 18. During refueling, an outer filler neck access door 13 is moved relative to a vehicle body panel 15 to expose filler neck closure assembly 11 as shown, for example, in FIG. 1. Filler neck closure assembly 11 is located in a chamber 17 formed in vehicle 18 so that assembly 11 is "out of sight" when access door 13 is closed.

Small-diameter nozzle 20 is coupled to an unleaded fuel supply 19 by a hose 21. Large-diameter nozzle 22 is coupled to a diesel fuel supply 119 by a hose 121. In many cases, both nozzles 20, 22 will be available at a filling station. Nozzle inhibitor 10 in filler neck closure assembly 11 in vehicle 18 functions to block a consumer from inadvertently using small-diameter nozzle 20 to discharge unleaded fuel into a fuel tank filler neck 12 of a vehicle that uses only diesel fuel.

Filler neck closure assembly 11 is assembled in one illustrative embodiment as shown, for example, in FIG. 3. Reference is hereby made to U.S. application Ser. No. 10/895,593, filed on Jul. 21, 2004 and titled "Closure and Vent System for Capless Filler Neck," which application is hereby incorporated by reference herein, for further details about the configuration and function of a suitable filler neck closure assembly 11. In the illustrated embodiment, a vacuum-relief apparatus 30 is included in assembly 11 to provide means for admitting ambient air into filler neck 12 whenever certain predetermined vacuum conditions develop in fuel tank 14 and filler neck 12. A pressure-relief apparatus 34 can be used (alone or with vacuum-relief apparatus 30) to discharge excess pressurized fuel vapor from filler neck 12 through assembly 11 to the surroundings. It is within the scope of this disclosure to omit the vacuum/pressure-relief apparatus.

Filler neck closure assembly 11 includes a housing 36 configured to contain nozzle inhibitor 10 and adapted to be coupled to a mouth of filler neck 12 in the manner shown, for example, in FIG. 3. A sealing gasket 37 is interposed between housing 36 and filler neck 12 to establish a sealed connection therebetween. In an illustrative embodiment, a fill tube 13 comprises filler neck 12 and housing 36 coupled to filler neck 12 and nozzle inhibitor 10 is located in a nozzle-receiving passageway 15 formed in fill tube 13 as shown, for example, in FIG. 3.

Nozzle inhibitor 10 includes a foundation 101 and hooks 100 coupled to foundation 101 and arranged to lie in a central aperture 102 formed in foundation 101 along annular edge 102' as shown, for example, in FIGS. 2 and 3. Each hook 100 includes a cantilevered arm 103 comprising an inclined cam ramp 104 and an extension segment 105. Each hook 100 further includes a retention finger 106 coupled to a free end of extension segment 105 and arranged to extend in a radially inward direction toward a central axis 107 of foundation 101 extending through central aperture 102. In an illustrative embodiment, nozzle inhibitor 10 is monolithic and made of a plastics material to allow for elastic deformation of hooks 100 relative to foundation 101 as suggested in FIGS. 6-8.

In the illustrated embodiment, housing 36 comprises a base 38, an outer body 40 coupled to base 38, and an outer shell 42 coupled to outer body 40. Foundation 101 of nozzle inhibitor 10 is mounted, for example, in a cavity formed in base 38 to lie in an interior region or outer nozzle-receiving passageway 48 formed in housing 36 between base 38 and outer body 40. Foundation 101 is arranged as shown, for example, in FIG. 3 to divide interior region 48 into an inner vent chamber 50 below foundation 101 and an outer vent chamber 52 above foundation 101. Foundation 101 and base 38 cooperate to form channel means 53 for conducting air and/or fuel vapor between inner and outer vent chambers 50, 52 while foundation 101 is mounted in interior region 48 to define inner and outer chambers 50, 52. Foundation 101 is arranged to shield components defining vacuum-relief apparatus 30 and pressure-relief apparatus 34 from any contaminant material inadvertently introduced into outer vent chamber 52.

As suggested in FIG. 3, housing 36 also includes a vent passage 54 and/or 54' having an outer end opening into inner vent chamber 50 located in interior region 48 and an inner end adapted to open into fuel tank filler neck 12 when housing 36 is coupled to filler neck 12. A flow control valve assembly such as a vacuum-relief apparatus 30 or pressure-relief apparatus 34 can be placed in vent passage 54 or 54' to regulate flow of a gas (e.g., air or fuel vapor) through vent passage 54 of 54'.

Housing 36 is adapted to be coupled to fuel tank filler neck 12 to provide a fill tube 13 configured to receive a fuel-dispensing pump nozzle during refueling of fuel tank 14. Housing 36 includes a top wall 56 provided, for example, on outer shell 42 and formed to include an outer nozzle-receiving aperture 58 normally closed by outer closure 60. Outer closure 60 can be moved (e.g., pivoted) by a pump nozzle of any size to assume an opened position during refueling as suggested in FIGS. 4 and 8. Housing 36 also includes a bottom wall 62 provided, for example, on base 38 and formed to include an inner nozzle-receiving aperture 64 normally closed by an inner flapper door 66. Flapper door 66 is arranged to be moved (e.g., pivoted) by large-diameter nozzle 22 to assume an opened position during refueling as suggested in FIG. 8.

As suggested in FIGS. 3 and 4, outer closure 60 includes an appearance door 59 mounted for pivotable movement relative to outer body 40 and configured to carry a seal member 61. When outer closure 60 is moved to assume the closed position, appearance door 59 occludes outer nozzle-receiving opening 58 and seal member 61 establishes a sealed connection between top wall 56 of outer shell 42 and appearance door 59.

As also suggested in FIG. 3, an annular seal 65 is configured to mate with flapper door 66 upon movement of flapper door 66 to assume the closed position. Seal retainer 67 is coupled to base 38 to retain annular seal 65 in a position surrounding inner nozzle-receiving opening 64 and engaging flapper door 66 upon movement of flapper door 66 to assume the closed position.

Foundation 101 of nozzle inhibitor 10 is arranged to divide interior region of 48 into outer and inner vent chambers 52, 50. Outer vent chamber 52 communicates with both outer and inner nozzle-receiving apertures 58, 64 as suggested in FIG. 3. Outer vent chamber 52 also defines a pump nozzle-receiving passageway adapted to receive pump nozzle 20 or 22 therein as suggested in FIGS. 4 and 6 during movement of the pump nozzle through outer and inner nozzle-receiving apertures 58, 64 to move outer closure 60 and, in the case of large-diameter nozzle 22, flapper door 66 to opened positions during fuel tank refueling. Inner vent chamber 50 communicates with vent passages 54, 54' as suggested in FIG. 3. Inner vent chamber 50 also communicates with outer vent chamber 52 via suitable channel means 53.

Outer shell 42 includes an annular skirt 68 coupled to top wall 56. Means 72 is appended to an underside of top wall 56 for coupling outer shell 42 to outer body 40.

Outer body 40 includes an outer side wall 78 sized to fit in and mate with annular skirt 68 of outer shell 42, a lower rim 80 including an annular inner side wall 82 extending upwardly toward top wall 56 of outer shell 42, several small fasteners 84 extending downwardly from lower rim 80, and one large fastener 86 extending downwardly from lower rim 80 as suggested in FIG. 3. A spaced-apart pair of pivot mounts is coupled to annular inner side wall 82 and arranged to extend into a cavity 90 formed in outer body 40 to support pivot arms appended to appearance door 59 so that appearance door 59 is able to pivot about a pivot axis extending through pivot arms as appearance door 59 moves between opened and closed positions. A spring mount is also provided in a cavity 90 of outer body 40 and located midway between the pivot mounts to receive a portion of a torsion spring 96 provided to bias outer closure 60 normally to assume the closed position.

Appearance door 59 in an illustrative embodiment is made of a plastics material and includes a round top wall 110, an annular upright wall 112 depending from a perimeter edge of top wall 110 and formed to include a plurality of circumferentially spaced-apart tether-receiving holes, and an annular lateral wall 116 extending radially outwardly from a perimeter edge of annular upright wall 112. Seal member 61 is over-molded onto appearance door 59 to produce outer closure 60 in the illustrated embodiment.

Nozzle inhibitor 10 is formed to include nine circumferentially spaced-apart hooks 100 in an illustrative embodiment as suggested in FIG. 2. As also suggested in FIGS. 2 and 3, inclined cam ramp 104 of each hook 100 is a conic section and has a wider portion appended to foundation 101 at border edge 106 and a narrow portion appended to upright extension segment 105. In an illustrative embodiment, nozzle inhibitor 10 is a monolithic element made of a suitable elastic material to allow hooks 100 to flex and recover their shape as suggested in FIGS. 6-8. It is within the scope of this disclosure to make nozzle inhibitor 10 from a plastics materials as shown or from a suitable metal.

Foundation 101 includes a round top wall 113 formed to include border edge 102' and an annular side wall 115 appended to a perimeter edge of round top wall 113. One or more stabilizers 117 is appended to an underside of round top wall 113 as suggested in FIG. 3. Side wall 115 and stabilizer (s) 117 mate with portions of base 38 of housing 36 to locate flexible hooks 100 in a region confronting inner nozzle-receiving aperture 64 as suggested in FIG. 3. Hooks 100 are arranged to lie in circumferentially spaced-apart relation to one another along border edge 102' and deflect in radially inward and outward directions relative to a central axis 107 passing through the opening defined by border edge 102'. An annular inner wall 118 is arranged to depend from top wall 113 and surround inclined cam ramps 104 of arms 103 included in hooks 100 as suggested in FIG. 3.

It is within the scope of this disclosure to form some portion of foundation 101 or base 38 to include vent channel means 53. In the illustrated embodiment, top wall 113 is formed to include vent channel means 53. A series of spaced-apart notches (not shown) which cooperate to define vent channel means 53 for allowing flow of air and/or fuel vapor between inner and outer vent chambers 50, 52 can be provided.

As shown in FIG. 3, annular seal 65 is arranged to contact flapper door 66 upon movement of flapper door 66 to the closed position to establish an annular seal between housing 36 and flapper door 66. Flapper door 66 includes pivot arms 184 mounted to pivot on a pivot shaft 185 associated with base 38, a raised dome 186 including a top wall facing toward a bottom wall 62 of base 38 and an annular side wall extending a direction away from bottom wall 62, and a dome support interposed between pivot arms 184 and raised dome 186. Annular seal 65 is gripped by seal retainer 67. An inclined nozzle-engaging surface (not shown) can be appended to raised dome 186 to contact pump nozzle 22 during opening of flapper door 66. A torsion spring (not shown) is provided to bias flapper door 66 normally and yieldably to the closed position shown in FIG. 3.

Base 38 of housing 36 includes first and second shaft mounts 385 as shown, for example, in FIG. 3. Each shaft mount 385 is adapted to be coupled to pivot shaft 185 to support pivot shaft 185 for movement relative to shaft mounts 385.

Owing to the modularity of nozzle inhibitor 10, assembly 11 can be configured easily to accept small-diameter unleaded fuel-dispensing pump nozzles 20 or larger-diameter diesel fuel-dispensing pump nozzles 22. Assembly 11 can be adapted to work with either style of pump nozzle by manufacturing assembly 11 to include a foundation 101 configured to work with the desired style of pump nozzle. During manufacture, the foundation is selected from a group comprising a first foundation (not shown) formed without hooks 100 and associated with a small-diameter unleaded fuel-dispensing pump nozzle 20 and a second foundation 101 including hooks 100 and associated with a larger-diameter diesel fuel-dispensing pump nozzle 22.

Filler neck closure assembly 11 is shown in FIGS. 1 and 3 just before a pump nozzle operator begins to pump fuel into fuel tank filler neck 12. Nozzle inhibitor 10 is provided in filler neck closure assembly 11 to block that operator from pumping unleaded fuel into a fuel tank in a vehicle having a diesel engine.

Outer appearance door 59 and an inner flapper door 66 are biased to assume their unpivoted, sealed, closed positions. Nozzle inhibitor 10 is interposed between outer appearance door 59 and inner flapper door 66.

In the embodiment shown in FIGS. 4-8, retainer 24 is arranged to retain flapped door 66 in a closed position and block downward movement of a small-diameter nozzle 20. A large-diameter nozzle 22 can operate nozzle inhibitor 10 to release retainer 24 and flapper door 66 coupled to retainer 24 and so that large-diameter nozzle 22 can pivot flapper door 66 to an opened position.

Retainer 24 is provided to link inner flapper door 66 to nozzle inhibitor 10 automatically upon movement of inner flapper door 66 to assume a closed position as suggested, for example, in FIGS. 3-6. In the illustrated embodiment, retainer 24 is somewhat "doorknob-shaped" and is coupled to an upwardly facing portion of flapper door 66. Retainer 24 includes an enlarged head 130 arranged to overlie retention fingers 106 of hooks 100 and a throat 132 arranged to interconnect enlarged head 130 and flapper door 66.

In an illustrative embodiment, nozzle inhibitor 10 includes retention fingers 106 that cooperate to provide means for gripping retainer 24 automatically upon movement of inner flapper door 66 to the closed position and retention fingers 106 toward one another into an annular channel 134 formed in retainer 24 as shown, for example, in FIGS. 4-6 until a later time when retention fingers 106 are moved to assume a spread position as shown, for example, in FIGS. 7 and 8 to release retainer 24. Once retainer 24 is released, inner flapper door 66 can be pivoted to an opened position as shown, for example, in FIG. 8. In an illustrative embodiment hooks 100 cooperate to define the gripping means.

Figure 6:
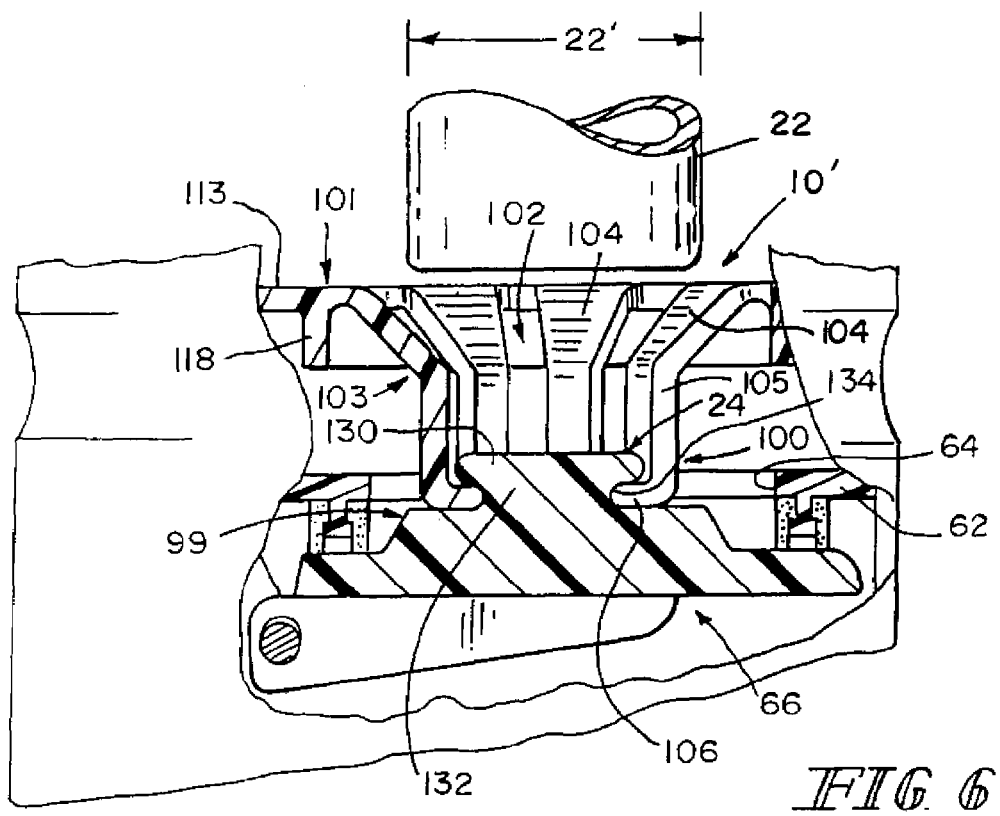
FIG. 6 is a view similar to FIGS. 4 and 5 showing a tip of a large-diameter diesel fuel-dispensing pump nozzle moving downwardly in the filler neck toward the nozzle inhibitor while the radially inwardly extending retention fingers included in the hooks provided in the nozzle inhibitor grip the retainer to lock the inner flapper door in the closed position.

As suggested in FIGS. 4-6, retainer 24 is configured to "snap" into a position placing enlarged head 130 above retention fingers 106 of hooks 100 so as to retain flapper door 66 in its closed position. Hooks 100 will deflect as enlarged head 130 is moved upwardly to engage hooks 100 in nozzle inhibitor 10 whenever flapper door 66 closes. Hooks 100 are arranged to extend into a radially outwardly opening annular channel 134 formed in retainer 24 upon movement of retention fingers 106 to the closed position as shown, for example, in FIG. 4 to limit movement of inner flapper door 66 relative to the filler neck or fill tube containing inhibitor 10.

As suggested in FIG. 5, movement of a small-diameter non-diesel fuel nozzle 20 into a filler neck is blocked by retainer 24 and hooks 104. As suggested in FIGS. 6 and 7, movement of a large-diameter diesel fuel nozzle 22 into the filler neck moves inclined cam ramps 104 relative to one another to move hooks 100 out of the path of nozzle 22 to establish a spread position of retention fingers 106 so that retainer 24 is released and further movement of nozzle 22 to open flapper door 66 is permitted as shown, for example, in FIG. 8.

In an illustrative embodiment, a nozzle inhibitor apparatus comprises a housing 36 adapted to be coupled to a fuel tank filler neck 12 of a motor vehicle 18 having a diesel engine, a closure 99 including a flapper door 66 and a retainer 24, and a nozzle inhibitor 10 including a retainer anchor 106 and filler neck access means 101, 103 coupled to retainer anchor 106. Housing 36 is formed to include an outer nozzle-receiving aperture 58, a wall 62 formed to include an inner nozzle-receiving aperture 64, and a nozzle-receiving passageway 48 formed between outer nozzle-receiving opening 58 and wall 62. Flapper door 66 is mounted for movement relative to wall 62 between a closed position closing inner nozzle-receiving aperture 58 formed in wall 62 and an opened position allowing movement of a fuel-dispensing pump nozzle 22 through inner nozzle-receiving aperture 58 in response to engagement of flapper door 66 with a fuel-dispensing pump nozzle 22 moving downwardly through inner and outer nozzle-receiving apertures 58, 64 toward fuel tank filler neck 12. Retainer 24 is coupled to flapper door 66 to move therewith relative to housing 36.

Figure 7:
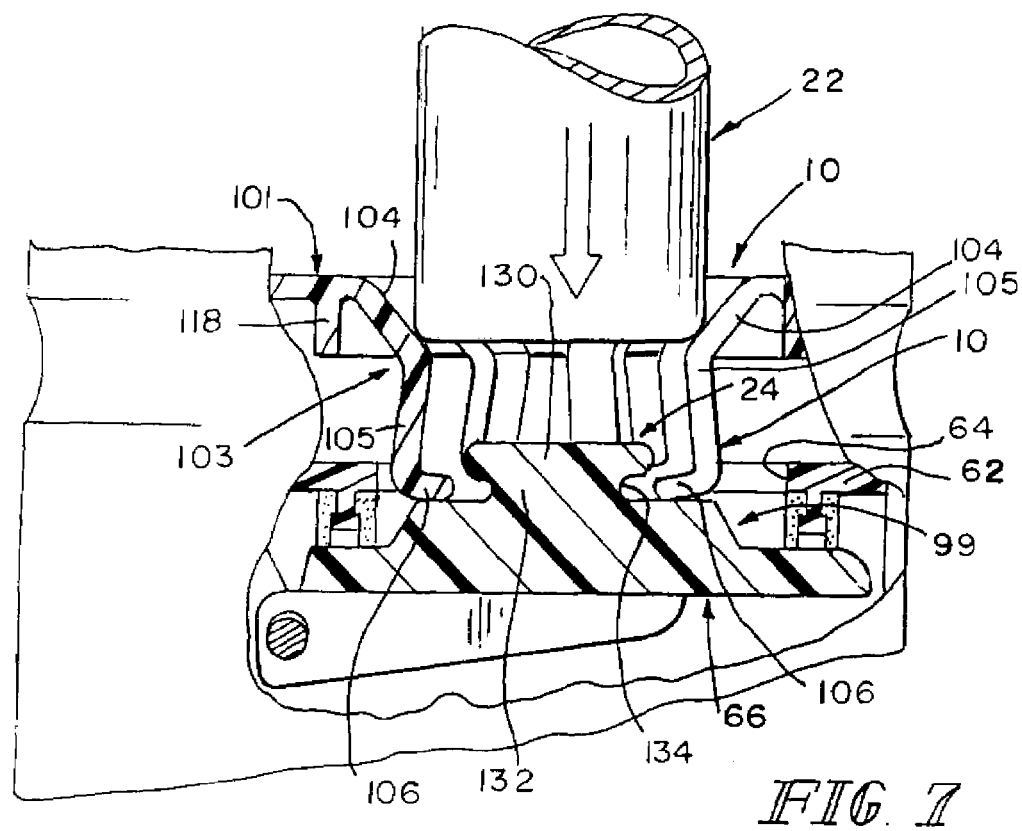
FIG. 7 is a view similar to FIGS. 4-6 showing further downward movement of the large-diameter nozzle into the filler neck to engage and ride on inclined cam ramps included in the hooks provided in the nozzle inhibitor to cause all of the radially inwardly extending retention fingers in the nozzle inhibitor to move in radially outward directions out of the path of the downwardly moving nozzle so that (1) the retainer coupled to the inner flapper door is "released" from engagement with the retention fingers, thus freeing the inner flapper door to pivot about an axis to an opened position and (2) further downward movement of the large-diameter nozzle through the central aperture formed in the nozzle inhibitor toward the inner flapper door and through a nozzle-receiving aperture formerly closed by the inner flapper door is permitted.
Figure 8:
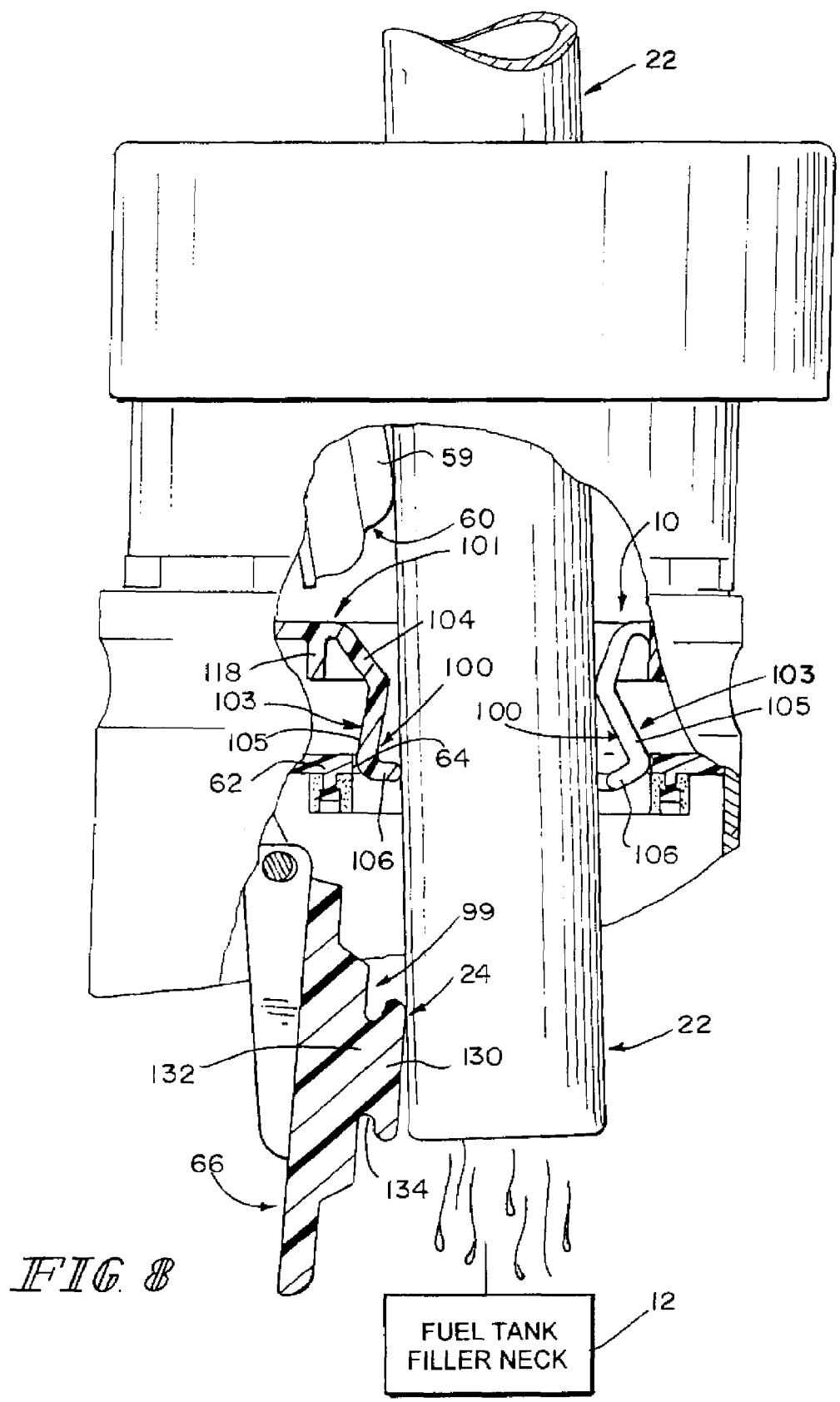
FIG. 8 is a view similar to FIGS. 4-7 showing movement of the tip of the large-diameter nozzle through a widened nozzle-receiving opening established in the central aperture between the spread-apart hooks of the nozzle inhibitor to pivot the inner flapper door about its pivot axis to assume an opened position and move the retainer carried on the inner flapper door away from the nozzle inhibitor and showing dispensing of liquid diesel fuel into a fuel tank filler neck.

Retainer anchor 106 is arranged to move between an extended door-locking position engaging retainer 24 on flapper door 66 as shown in FIG. 4 to hold flapper door 66 in the closed position and a retracted door-releasing position disengaging retainer 66 on flapper door 66 as shown in FIGS. 7 and 8 to free flapper door 66 to be moved from the closed position to the opened position. Filler neck access means 101, 103 functions to move retainer anchor 106 from the extended position to the retracted position in response to movement of a large-diameter diesel fuel-dispensing pump nozzle 22 in housing 36 in a downward direction toward flapper door 66 and for blocking movement of retainer anchor 106 from the extended position to the retracted position in response to movement of a relatively smaller small-diameter unleaded fuel-dispensing pump nozzle 20 in housing 36 in the downward direction toward flapper door 66.

Wall 62 is positioned to lie between outer nozzle-receiving opening 58 formed in housing 36 and flapper door 66. Retainer 24 is arranged to extend upwardly from flapper door 66 in a direction toward outer nozzle-receiving opening 58 upon movement of flapper door 66 to the closed position. Retainer 24 is formed to include a radially outwardly opening channel 134 sized to receive retainer anchor 106 therein upon movement of retainer anchor 106 to the extended door-locking position as suggested in FIGS. 4-6.

Retainer 24 includes an inner portion (I) arranged to extend into inner nozzle-receiving aperture 64 upon movement of flapper door 66 to the closed position and an outer portion (O) arranged to lie outside inner nozzle-receiving aperture 64 in a nozzle-receiving passageway 48 provided in housing 36 between wall 62 and outer nozzle-receiving aperture 58 upon movement of flapper door 66 to the closed position. Outer portion (O) is formed to include radially outwardly opening channel 134. Retainer anchor 106 extends into radially outwardly opening channel 134 formed in outer portion (O) upon movement of retainer anchor 106 to the extended door-locking position to limit movement of flapper door 66 relative to wall 62 from the closed position toward the opened position.

Retainer anchor 106 includes several retention fingers 106. Filler neck access means 101, 103 includes a foundation 101 mounted in nozzle-receiving passageway 48 formed in housing 36 between outer nozzle-receiving opening 58 formed in housing 30 and wall 62. Foundation 101 is formed to include a central aperture 102. Filler neck access means 101, 103 further includes several arms 103. Each retention finger 106 is coupled to a free end of one of arms 103 and is arranged to extend radially inwardly toward a central axis 107 of central aperture 102. Arms 103 are mounted on foundation 101 for movement between a closed position in which retention fingers 106 cooperate to grip retainer 24 to limit movement of flapper door 66 relative to wall 62 from the closed position to the opened position and a spread position in which retention fingers 106 are spread apart from one another away from central axis 107 to disengage retainer 24 to allow movement of flapper door 66 relative to wall 62 toward the opened position in response to a force applied to flapper door 66 by a moving large-diameter diesel fuel-dispensing pump nozzle 22 to enlarge central aperture 62 to define a widened nozzle-receiving opening between arms 103 and retention fingers 106 as shown in FIG. 8 to allow a large-diameter diesel fuel-dispensing pump nozzle 22 moving downwardly in passageway 48 formed in housing 36 to contact flapper door 66 and move flapper door 66 relative to wall 62 from the closed position to tie opened position.

Each arm 103 includes an inclined cam ramp 104 and inclined cam ramps 104 cooperate to provide means for moving retention fingers 106 away from one another and central axis 107 to define the widened nozzle-receiving opening and to establish the spread position of retention fingers 106 in response to engagement of large-diameter diesel fuel-dispensing pump nozzle 22 moving downwardly in passageway 48 formed in housing 36 and in central aperture 102 of foundation 101 with inclined cam ramps 104.

Flapper door 66 includes an inner portion aligned with the outer and inner nozzle-receiving openings 58, 64 to face toward a large-diameter diesel fuel-dispensing pump nozzle 22 moving downwardly in housing 36 through outer nozzle-receiving opening 58 toward flapper door 66 when flapper door 66 is located in the closed position. Retainer 24 includes an enlarged head 130 arranged to lie above and in spaced-apart relation to the inner portion of flapper door 66 to define radially outwardly opening channel 134 located therebetween and sized to receive retainer anchor 106 therein upon movement of retainer anchor 106 to the extended door-locking position. Retainer 24 further includes a throat 132 arranged to interconnect enlarged head 130 and the inner portion of flapper door 66 to support enlarged head 130 above and in spaced-apart relation to the inner portion of flapper door 66. Retention fingers 106 are arranged to extend in radially inward directions into radially outwardly opening channel 134 located between enlarged head 130 and the inner portion of flapper door 66 upon movement of retainer anchor 106 to the extended position.

Figure 14:
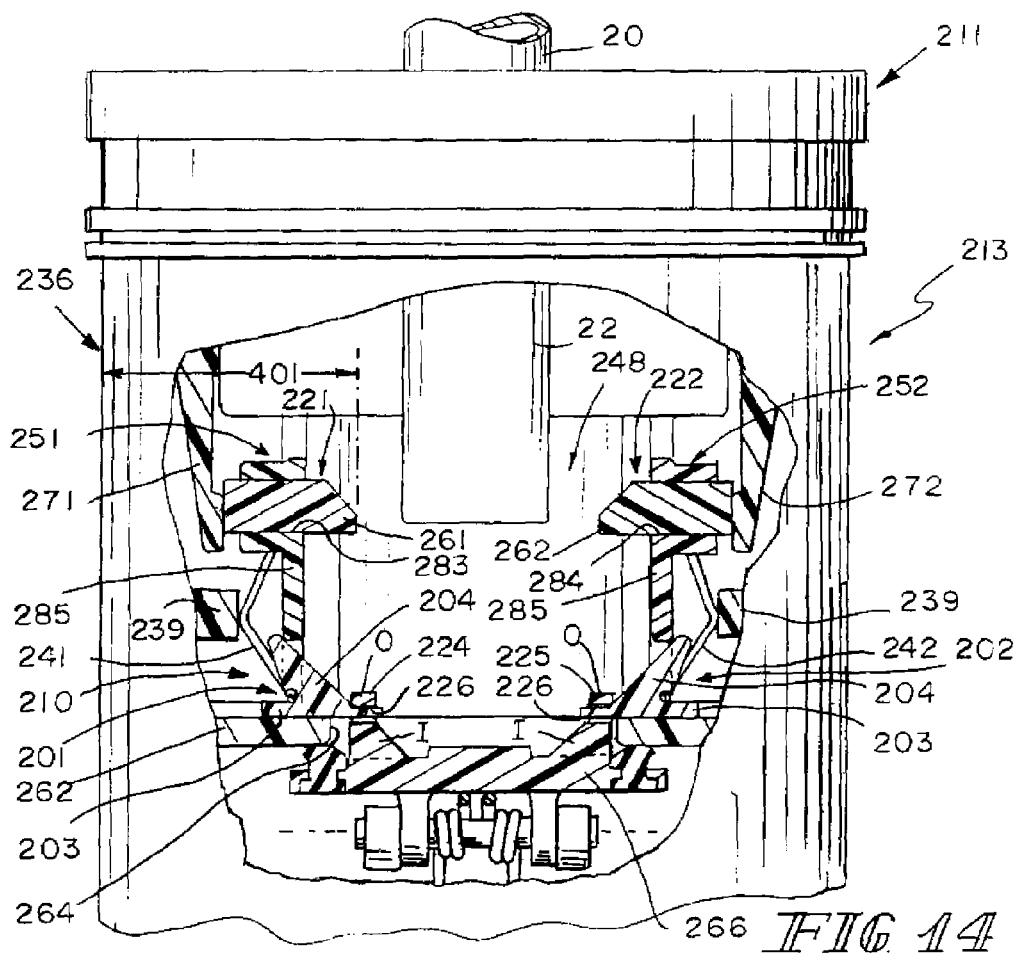
Figure 15:
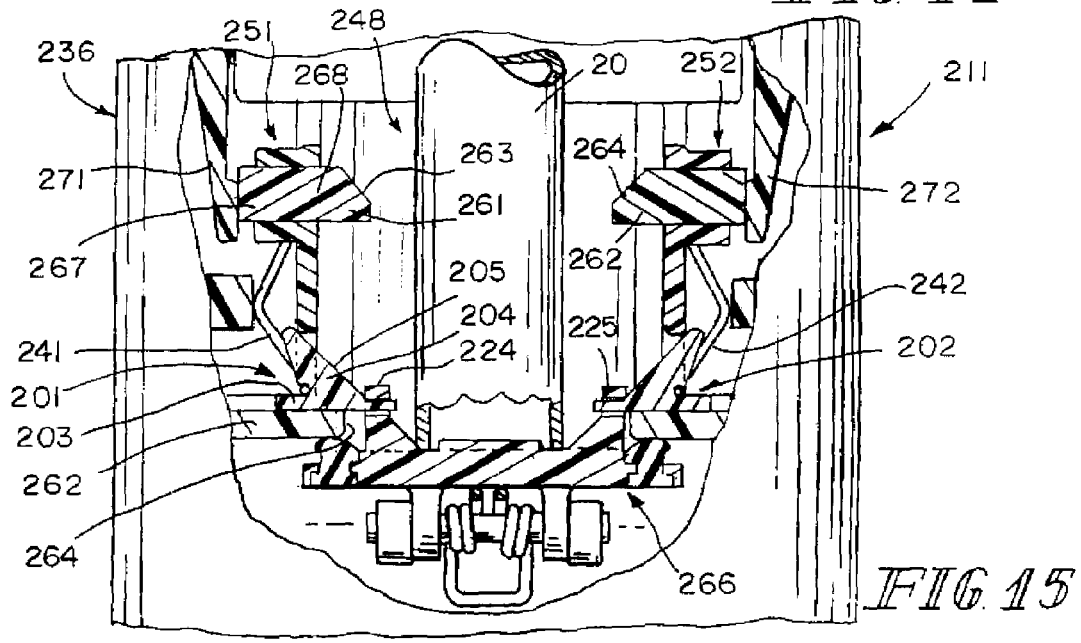
Figure 16:
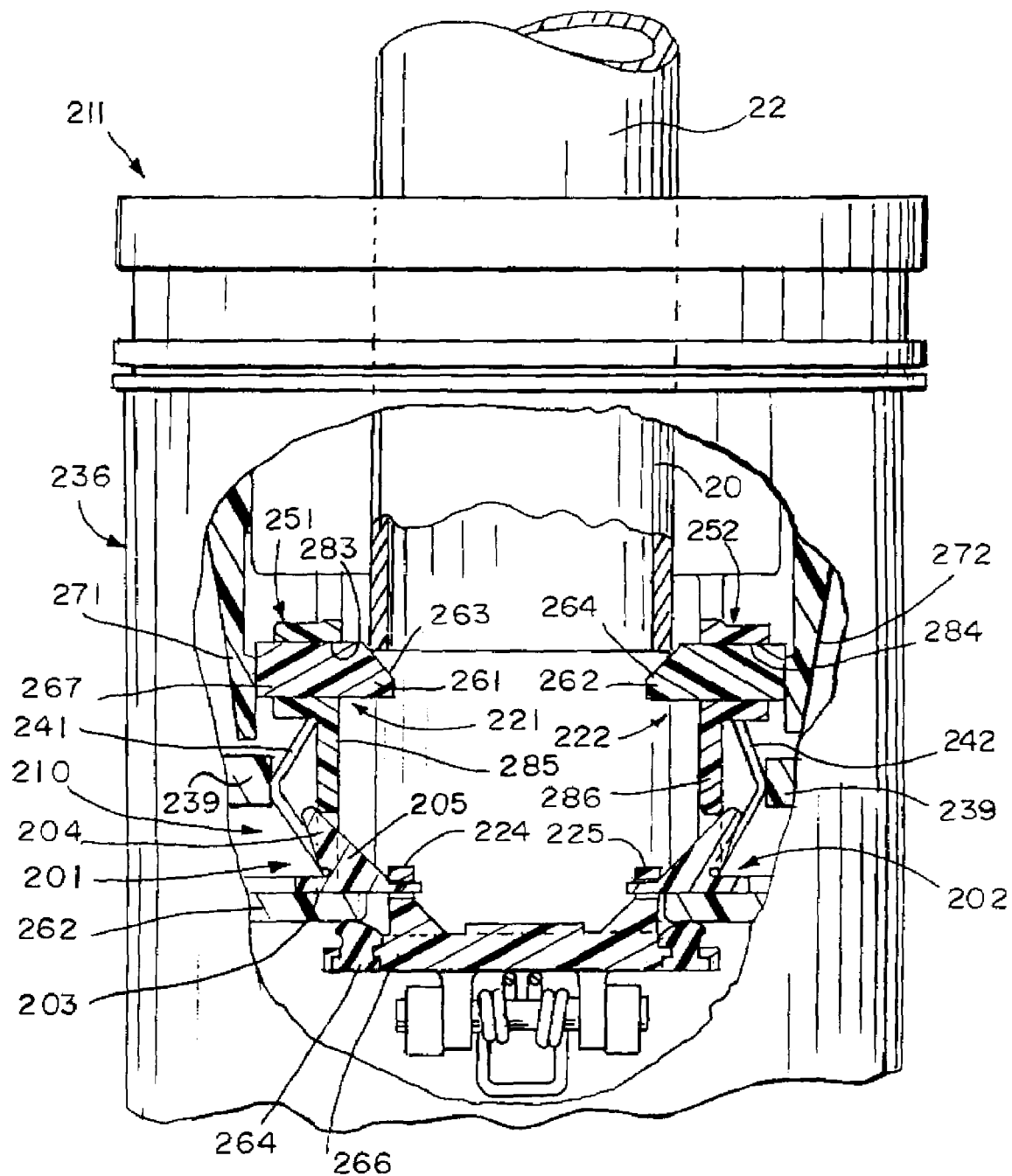
Figure 17:
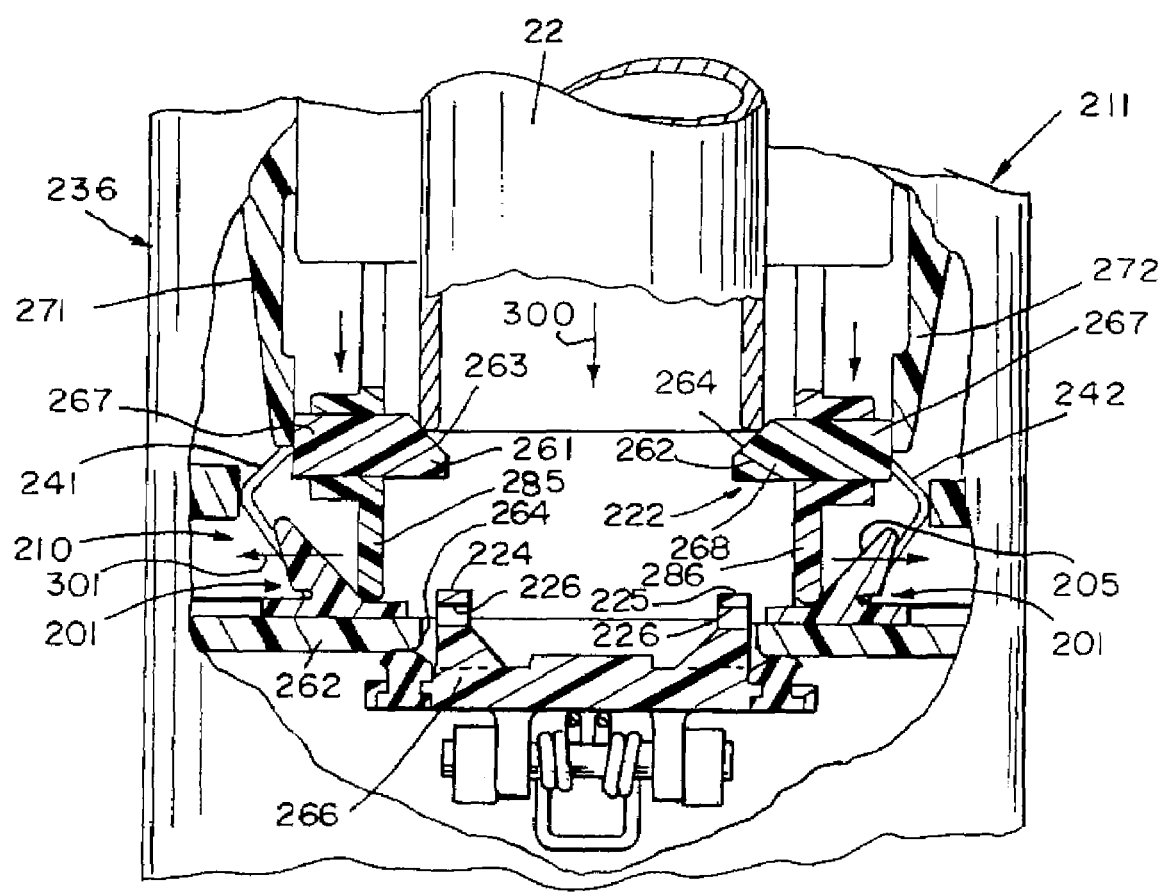
Figure 18:
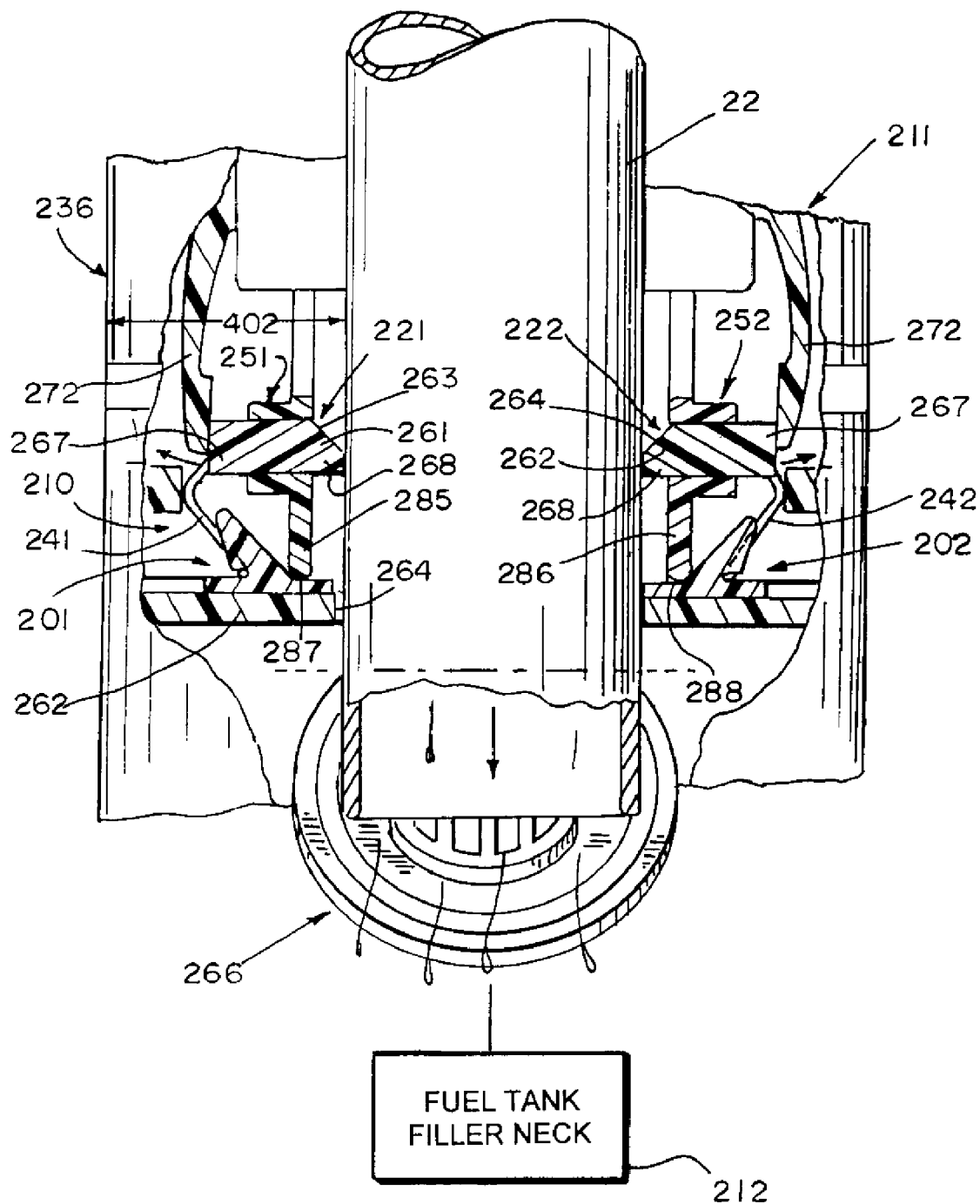

A filler neck closure assembly 211 in accordance with another embodiment of the disclosure is shown, for example, in FIGS. 9-18. As suggested in FIG. 9, a fill tube 213 includes a housing 236 coupled to a filler neck 212 leading to a diesel-engine fuel tank 214. An annular seal 237 is interposed between housing 236 and filler neck 212. Nozzle inhibitor 210 is included in filler neck closure assembly 211 and is located inside housing 236. Nozzle inhibitor 210 is configured to block entry of a small-diameter unleaded fuel-dispensing pump nozzle 20 into filler neck 212 as shown in FIG. 15 yet allow entry of a large-diameter diesel fuel-dispensing pump nozzle 22 into filler neck 212 as shown in FIG. 18.

As suggested in FIG. 10, first and second retainers 224, 225 are coupled to an inner flapper door 266 that is mounted for pivotable movement inside housing 236 from a "closed" position shown in FIGS. 11, 12, and 14-17 to an "opened" position shown in FIG. 18. Flapper door 266 is locked normally in the closed position because a first door latch 201 included in nozzle inhibitor 210 mates with first retainer 224 and a second door latch 202 included in nozzle inhibitor 210 mates with second retainer 225 as shown in FIG. 10. Further, first and second latch actuators 221, 222 are also provided in housing 236 and arranged to contact a large-diameter nozzle 22 moving through housing 236 to move first and second door latches 201, 202 away from one another to unmate from first and second retainers 224, 225 to free inner flapper door 266 to pivot or otherwise move to the opened position shown in FIG. 18. By opening flapper door 266, the large-diameter nozzle 22 can be extended through housing 236 and into filler neck 212 to dispense diesel fuel into filler neck 212 for delivery to diesel-engine fuel tank 214.

Housing 236 is adapted to be coupled to fuel tank filler neck 212 and includes a wall 262 formed to include an inner nozzle-receiving aperture 264. Housing 236 is formed to include an outer nozzle-receiving aperture 258 and a nozzle-receiving passageway 248 formed between outer nozzle-receiving opening 258 and wall 262.

Flapper door 266 is mounted for movement relative to wall 262 between a closed position shown in FIGS. 11 and 14 closing inner nozzle-receiving aperture formed in wall 262 and an opened position shown in FIG. 18 allowing movement of large-diameter nozzle 22 through inner nozzle-receiving aperture 264 in response to engagement of flapper door 266 with nozzle 22 moving downwardly through inner and outer nozzle-receiving apertures 264, 258 toward fuel tank filler neck 212. Retainers 224 and 225 are coupled to flapper door 266 to move therewith relative to housing 236.

Nozzle inhibitor 210 includes a first retainer anchor 231 arranged to move between an extended door-locking position shown in FIGS. 11-14 engaging first retainer 224 on flapper door 266 to hold flapper door 266 in the closed position and a retracted door-releasing position shown in FIGS. 17 and 18 disengaging first retainer 24 on flapper door 266 to free flapper door 266 to be moved from the closed position to the opened position. Similarly, nozzle inhibitor 210 also includes a second retainer anchor 231 movable to engage and disengage second retainer anchor 225.

Nozzle inhibitor 210 also includes filler neck access means 221, 222 for moving retainer anchors 231, 232 relative to one another and to flapper door 266 from the extended positions to the retracted positions in response to movement of a large-diameter diesel fuel-dispensing pump nozzle 20 in housing 236 in a downward direction 300 toward flapper door 266 as suggested in FIGS. 14 and 15. In illustrative embodiments, filler neck access means 221, 222 is located inside housing 236.

Wall 262 is positioned to lie between outer nozzle-receiving opening 258 formed in housing 236 and flapper door 266. Retainers 224, 225 are arranged to extend upwardly from flapper door 266 in a direction toward outer nozzle-receiving opening 258 upon movement of flapper door 266 to the closed position. Retainers 224, 225 are each formed to include a radially outwardly opening channel 226 sized to receive one of retainer anchors 231, 232 therein upon movement of retainer anchors 231, 232 to the extended door-locking positions as suggested in FIGS. 14-16.

As shown in FIG. 14, each retainer 224, 225 includes an inner portion (I) arranged to extend into inner nozzle-receiving aperture 264 upon movement of flapper door 266 to the closed position and an outer portion (O) arranged to lie outside inner nozzle-receiving aperture 264 in a nozzle-receiving passageway 248 provided in housing 236 between wall 262 and outer nozzle-receiving aperture 258 upon movement of flapper door 266 to the closed position. Outer portion (O) is formed to include radially outwardly opening channel 226. Each retainer anchor 231, 232 extends into one of the radially outwardly opening channels 226 formed in outer portion (O) of each retainer 224, 225 upon movement of retainer anchor 231, 232 to the extended door-locking position to limit movement of flapper door 266 relative to wall 262 from the closed position toward the opened position.

First retainer anchor 231 includes a first door latch 201 and a door-latch return spring 241 as suggested in FIGS. 13 and 14. First door latch 201 is mounted for lateral movement in housing 236 between the extended door-locking position wherein first door latch 201 mates with first retainer 224 to lock flapper door 266 in the closed position and the retracted door-releasing position wherein first door latch 201 unmates from first retainer 224 to allow movement of flapper door 266 away from the closed position to the opened position. Door-latch return spring 241 is arranged to act between first door latch 201 and housing 236 normally to yieldably urge first door latch 201 from the retracted door-releasing position toward the extended door-locking position. Second retainer anchor 232 similarly includes second door latch 201 and second door latch return spring 242 as suggested in FIGS. 13 and 14.

As shown, for example, in FIGS. 16 and 17, each door latch 201, 202 is configured to slide back and forth on a flat top surface of wall 262 in housing 236. Each of door-latch return springs 241, 242 is a bent wire made of spring steel. A lower end of first door-latch return spring 241 fits into a slot formed in first door latch 201. An upper end of first door-latch return spring 241 is coupled to first actuator head 221. First door-latch return spring 241 illustratively is V-shaped and has a mid-portion arranged to contact a flange 239 included in housing 236. It is within the scope of this disclosure to use compression springs or other suitable springs to define first and second door-latch return springs 241, 242.

Filler neck access means includes a first latch actuator 221 mounted for up-and-down movement in housing 236 between a raised position suggested in FIGS. 13-16 allowing first door latch 201 to remain in the extended door-locking position and a lowered position suggested in FIGS. 17 and 18 urging first door latch 201 against a spring force generated by first door-latch return spring 241 to move to assume the retracted door-releasing position. Filler neck access means also includes a second latch actuator 222 mounted for up-and-down movement in housing 236 between a raised position allowing second door latch 202 to remain in the extended door-locking position and a lowered position urging second door latch 202 against a spring force generated by second door-latch return spring 242 to move to assume the retracted door-releasing position.

First door latch 201 includes a laterally extending anchor bar 203 arranged to mate with first retainer 224 (e.g., fit into channel 226) to lock flapper door 266 in the closed position upon movement of first door latch 201 to the extended door-locking position as shown in FIGS. 13 and 14. First door latch 201 also includes an "angled" and "swept-back" anchor bar mover 204 coupled to anchor bar 203 to move therewith. Anchor bar mover 204 is arranged to engage first latch actuator 221 in camming relation to cause anchor bar 203 to move laterally relative to housing 236 in direction 301 to unmate from first retainer 224 upon downward movement in direction 300 of first latch actuator 221 in housing 236 to engage and slide on an inclined ramp 205 included in anchor bar mover 204 during movement of first latch actuator 221 from the raised position toward the lowered position. First door-latch return spring 241 is coupled to and acts between anchor bar 203 and housing 236 normally to yieldably urge anchor bar 203 to mate with first retainer 224. Second door latch 202 also includes an anchor bar 203 and an anchor bar mover 204 as suggested in FIGS. 13 and 14.

First latch actuator 221 includes a first latch driver 251 mounted for up-and-down movement in channels or guides provided in housing 236 to mate with and unmate from first door latch 201. First latch actuator 221 also includes a first actuator head 261 mounted on first latch driver 251 to move up and down therewith and to move laterally relative to housing 236 and to first latch driver 251 between a projected position shown in FIGS. 13 and 14 and a withdrawn position shown in FIG. 18. In the projected position, first actuator head 261 is arranged to extend a first distance 401 (see FIG. 14) into a nozzle-receiving passageway 248 formed in housing 236 to engage a large-diameter diesel fuel-dispensing pump nozzle 22 moving downwardly in nozzle-receiving passageway 248 in downward direction 300 toward flapper door 266 at a first elevation above flapper door 266. In the withdrawn position, first actuator head 261 is arranged to extend a second distance 402 (see FIG. 18) lesser than first distance into nozzle-receiving passageway 248 to allow further movement of large-diameter diesel fuel-dispensing pump nozzle 22 downwardly in nozzle-receiving passageway 248 in downward direction 300 toward flapper door 266 to reach flapper door 266 and move flapper door 266 relative to housing 236 to assume the opened position.

A first actuator head return spring 271 acts between first actuator head 261 and housing 236 normally to yieldably urge first actuator head 261 from the withdrawn position to the projected position. Similarly, second latch actuator 222 includes a second latch river 252 carrying a second actuator head 261 biased to a projected position by an actuator head return spring 272 as suggested in FIGS. 13 and 14. Illustratively, first and second actuator head return springs 271, 272 are molded to be integral components formed in housing 236.

First door latch 201, as suggested in FIG. 13, includes an inclined ramp 205 arranged to face upwardly toward first latch driver 251. First latch driver 251 includes a first latch driver base 281 formed to include a head-receiver passageway 283. First actuator head 261 is arranged to extend through and move laterally in head-receiver passageway 283 between the projected and withdrawn positions. First latch driver 251 further includes a first latch driver arm 285 having an upper end coupled to first latch driver base 281 to move therewith and a downwardly presented free end 287 arranged to engage inclined ramp 205 of first door latch 201 in camming relation to cause first door latch 201 to move from the extended door-locking position to the retracted door-releasing position to unmate first door latch 201 from first retainer 224 upon downward movement of first latch driver 251 in housing 236 to cause first latch driver arm 285 to engage and slide on first inclined ramp 205 during movement of first latch actuator 221 from the raised position toward the lowered position. Similarly, second latch driver 252 includes second latch driver base 282 formed to include a head-receiver passageway 284 and a second latch driver arm 286. A downwardly presented free end 288 of second latch driver arm 286 engages and slides on second inclined ramp 205 of second door latch 202 as also suggested in FIG. 13.

A diagrammatic illustration of nozzle inhibitor 210 is shown in FIG. 13. Nozzle inhibitor 210 includes a first door latch 201 mounted for movement relative to housing 236, a first door-latch return spring 241, and latch actuator means 221, 271. First door-latch return spring 241 is arranged to act between first door latch 201 and housing 236 normally to yieldably urge first door latch 201 to mate with retainer 224 to hold flapper door 266 in the closed position and block movement of flapper door 266 to the opened position in response to engagement with a small-diameter unleaded fuel-dispensing pump nozzle 20 having a first diameter 20' and moving downwardly in nozzle-receiving passageway 248 to engage flapper door 266. Flapper door 266 and retainer 224 cooperate to define closure 299. Latch actuator means 221, 271 operates to intercept a large-diameter diesel fuel-dispensing pump nozzle 22 having a relatively larger second diameter 22' and moving downwardly in nozzle-receiving passageway 248 and apply a force to move first door latch 201 relative to flapper door 266 to unmate from retainer 224 to allow movement of flapper door 266 to the opened position. Nozzle inhibitor 210 also includes second door latch 202, door latch return spring 242, and latch actuator means 222, 272 as described and illustrated herein.

In this embodiment, inner flapper door 266 is locked normally in a nozzle passageway-closing position in a filler neck closure assembly 211 as suggested in FIG. 13 by nozzle inhibitor 210. Inner flapper door 266 can be "unlocked" so that it can be moved to a nozzle passageway-opening position) only by movement of a large-diameter device 22 (e.g., a diesel fuel-dispensing nozzle) downwardly against inclined surfaces 263, 264 on latch actuators 221, 222 included in nozzle inhibitor 210 as suggested in FIGS. 16 and 17. As suggested in FIG. 13, a small-diameter unleaded fuel-dispensing nozzle 20 is unable to contact and move both inclined surfaces 263, 264 on latch actuators 221, 222 at the same time and thus cannot be moved to unlock inner flapper door 266.

In the illustrated embodiment, each door latch 221, 222 is mounted for sliding movement in a channel formed in housing 236 as suggested in FIG. 18 between the locking and unlocking positions. First door latch 221 can be inserted into nozzle-receiving passageway 248 through a T-shaped lower opening 298 formed on an exterior portion of housing side wall 297 as shown, for example, in FIGS. 9, 11, and 14. A similar lower opening is provided on wall 297 for second door latch 222. Each door latch 221, 222 is arranged to lie under a companion latch actuator 221, 222 as suggested in FIG. 13.

Each latch actuator 221, 222 in an illustrative embodiment includes a latch driver 251, 252 constrained to move up and down in housing 236 and an actuator head 261, 262 coupled to latch driver 251, 252 as shown, for example, in FIG. 13. As shown in FIG. 13, latch driver 251, 252 includes a latch driver base 281, 282 coupled to actuator bead 261, 262 and a latch driver arm 285, 286 extending downwardly from latch driver base 281, 282 to engage and move on an inclined ramp 205 formed on anchor bar mover 204. Downward movement of both latch driver arms 285, 286 causes arms 285, 286 to ride on inclined ramps 205 to spread door latches 201, 202 apart to move from locking positions to unlocking positions. Each actuator head 261, 262 includes an arm support 267 and an inwardly extending large-nozzle contact arm 268 having an inclined edge 263 or 264 arranged to extend into a nozzle-receiving passageway 248 to engage a large-diameter diesel fuel-dispensing nozzle 20.

Nozzle inhibitor 210 discriminates foreign objects from gas or diesel fill pipe. Insertion correct diameter nozzle is converted into vertical and horizontal forces. Vertical force communicated through an inclined ramp 205 is used to slide a door latch 201 from engagement with a locking receptacle 224 on the flapper door 266. Horizontal force is used at the end to disengage the inhibitor contact with the nozzle 20. Inclined plane on contact point forces component through hole in housing and engages a cantilevered finger or beam 239 which is integral to housing 236. Beam 239 generates a spring return force and is used to return the contact point to its previous horizontal position upon withdrawal of the nozzle 20. The door latch 201 is returned by means of a spring wire form 241. The inclined plane of the latch drives the actuator up to its home position.

The invention claimed is:

1. A nozzle inhibitor apparatus comprising a housing adapted to be coupled to a fuel tank filler neck of a motor vehicle having a diesel engine, the housing being formed to include an outer nozzle-receiving aperture, a wall formed to include an inner nozzle-receiving aperture, and a nozzle-receiving passageway formed between the outer nozzle-receiving aperture and the wall, a closure including a flapper door and a retainer, the flapper door being mounted for movement relative to the wall between a closed position closing the inner nozzle-receiving aperture formed in the wall and an opened position allowing movement of a fuel-dispensing pump nozzle through the inner nozzle-receiving aperture in response to engagement of the flapper door with a fuel-dispensing pump nozzle moving downwardly through the inner and outer nozzle-receiving apertures toward the fuel tank filler neck, the retainer being coupled to the flapper door to move therewith relative to the housing, and a nozzle inhibitor including a retainer anchor arranged to move between an extended door-locking position engaging the retainer on the flapper door to hold the flapper door in the closed position and a retracted door-releasing position disengaging the retainer on the flapper door to free the flapper door to be moved from the closed position to the opened position and access means for moving the retainer anchor from the extended position to the retracted position in response to movement of a large-diameter diesel fuel-dispensing pump nozzle in the housing in a downward direction toward the flapper door and for blocking movement of the retainer anchor from the extended position to the retracted position in response to movement of a relatively smaller small-diameter unleaded fuel-dispensing pump nozzle in the housing in the downward direction toward the flapper door, wherein the retainer anchor includes a door latch mounted for lateral movement in the housing between the extended door-locking position wherein the door latch mates with the retainer to lock the flapper door in the closed position and the retracted door-releasing position wherein the door latch unmates from the retainer to allow movement of the flapper door away from the closed position to the opened position and the retainer anchor further includes a door-latch return spring acting between the door latch and the housing normally to yieldably urge the door latch from the retracted door-releasing position toward the extended door-locking position and the access means includes a latch actuator mounted for up-and-down movement in the housing between a raised position allowing the door latch to remain in the extended door-locking position and a lowered position urging the door latch against a spring force generated by the door-latch return spring to move to assume the retracted door-releasing position.

2. The apparatus of claim 1, wherein the door latch includes an anchor bar arranged to mate with the retainer to lock the flapper door in the closed position upon movement of the door latch to the extended door-locking position and an anchor bar mover coupled to the anchor bar to move therewith and arranged to engage the latch actuator in camming relation to cause the anchor bar to move laterally relative to the housing to unmate from the retainer upon downward movement of the latch actuator in the housing to engage and slide on an inclined ramp included in the anchor bar mover during movement of the latch actuator from the raised position toward the lowered position.

3. The apparatus of claim 2, wherein the door-latch return spring is coupled to and acts between the anchor bar and the housing normally to yieldably urge the anchor bar to mate with the retainer.

4. The apparatus of claim 1, wherein the latch actuator includes a latch driver mounted for up-and-down movement in the housing to mate with and unmate from the door latch and an actuator head mounted on the latch driver to move up and down therewith and to move laterally relative to the housing and to the latch driver between a projected position arranged to extend a first distance into a nozzle-receiving passageway formed in the housing to engage a large-diameter diesel fuel-dispensing pump nozzle moving downwardly in the nozzle-receiving passageway in the downward direction toward the flapper door at a first elevation above the flapper door and a withdrawn position arranged to extend a second distance lesser than the first distance into the nozzle-receiving passageway to allow further movement of the large-diameter diesel fuel-dispensing pump nozzle downwardly in the nozzle-receiving passageway in the downward direction toward the flapper door to reach the flapper door and move the flapper door relative to the housing to assume the opened position.

5. The apparatus of claim 4, wherein the access means further includes an actuator head return spring acting between the actuator head and the housing normally to yieldably urge the actuator head from the withdrawn position to the projected position.

6. The apparatus of claim 4, wherein the door latch includes an inclined ramp arranged to face upwardly toward the latch driver, the latch driver includes a latch driver base formed to include a head-receiver passageway, the actuator head is arranged to extend though and move laterally in the head-receiver passageway between the projected and withdrawn positions, and the latch driver further includes a latch driver arm having an upper end coupled to the latch driver base to move therewith and a downwardly presented free end arranged to engage the inclined ramp of the door latch in camming relation to cause the door latch to move from the extended door-locking position to the retracted door-releasing position to unmate the door latch from the retainer upon downward movement of the latch driver in the housing to cause the latch driver arm to engage and slide on the inclined ramp during movement of the latch actuator from the raised position toward the lowered position.

7. The apparatus of claim 6, wherein the access means further includes an actuator head return spring acting between the actuator head and the housing normally to yieldably urge the actuator head from the withdrawn position to the projected position.

8. A nozzle inhibitor apparatus comprising a housing adapted to be coupled to a fuel tank filler neck of a motor vehicle having a diesel engine, the housing being formed to include an outer nozzle-receiving aperture, a wall formed to include an inner nozzle-receiving aperture, and a nozzle-receiving passageway formed between the outer nozzle-receiving aperture and the wall, a closure including a flapper door and a retainer, the flapper door being mounted for movement relative to the wall between a closed position closing the inner nozzle-receiving aperture formed in the wall and an opened position allowing movement of a fuel-dispensing pump nozzle through the inner nozzle-receiving aperture in response to engagement of the flapper door with a fuel-dispensing pump nozzle moving downwardly through the inner and outer nozzle-receiving apertures toward the fuel tank filler neck, the retainer being coupled to the flapper door to move therewith relative to the housing, and a nozzle inhibitor including a retainer anchor arranged to move between an extended door-locking position engaging the retainer on the flapper door to hold the flapper door in the closed position and a retracted door-releasing position disengaging the retainer on the flapper door to free the flapper door to be moved from the closed position to the opened position and access means for moving the retainer anchor from the extended position to the retracted position in response to movement of a large-diameter diesel fuel-dispensing pump nozzle in the housing in a downward direction toward the flapper door and for blocking movement of the retainer anchor from the extended position to the retracted position in response to movement of a relatively smaller small-diameter unleaded fuel-dispensing pump nozzle in the housing in the downward direction toward the flapper door, wherein the retainer anchor includes a door latch mounted for lateral movement in the housing between the extended door-locking position wherein the door latch mates with the retainer to lock the flapper door in the closed position and the retracted door-releasing position wherein the door latch unmates from the retainer to allow movement of the flapper door away from the closed position to the opened position and the retainer anchor further includes a door-latch return spring acting between the door latch and the housing normally to yieldably urge the door latch from the retracted door-releasing position toward the extended door-locking position and the door latch includes an inclined ramp and the access means includes a latch actuator mounted for movement in the housing to engage and slide on the inclined ramp in camming relation to move the door latch from the extended door-locking position to the retracted door-releasing position.

9. The apparatus of claim 8, wherein the latch actuator includes a latch driver arranged to engage and slide on the inclined ramp of the door latch and an actuator head mounted on the latch driver to move therewith and to move in the housing relative to the latch driver between a projected position arranged to extend a first distance into a nozzle-receiving passageway formed in the housing to engage a large-diameter diesel fuel-dispensing pump nozzle moving downwardly in the nozzle-receiving passageway in downward direction toward the flapper door at a first elevation above the flapper door and a withdrawn position arranged to extend a second distance lesser than the first distance into the nozzle-receiving passageway to allow further movement of the large-diameter diesel fuel-dispensing pump nozzle downwardly in the nozzle-receiving passageway in the downward direction toward the flapper door to reach the flapper door and move the flapper door relative to the housing to assume the opened position.

* * * * *